United States Patent
Kani

(10) Patent No.: US 10,336,885 B2
(45) Date of Patent: Jul. 2, 2019

(54) SAPONIFIED ETHYLENE-VINYL ESTER COPOLYMER COMPOSITION AND MULTILAYERED STRUCTURE USING SAID COMPOSITION

(71) Applicant: THE NIPPON SYNTHETIC CHEMICAL INDUSTRY CO., LTD., Osaka (JP)

(72) Inventor: Shouichi Kani, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 165 days.

(21) Appl. No.: 15/088,767

(22) Filed: Apr. 1, 2016

(65) Prior Publication Data

US 2016/0215116 A1 Jul. 28, 2016

Related U.S. Application Data

(63) Continuation of application No. PCT/JP2014/076510, filed on Oct. 3, 2014.

(30) Foreign Application Priority Data

Oct. 9, 2013 (JP) .................. 2013-211980
Nov. 1, 2013 (JP) .................. 2013-228217

(51) Int. Cl.
| | |
|---|---|
| *C08K 5/098* | (2006.01) |
| *C08K 3/34* | (2006.01) |
| *C08K 3/30* | (2006.01) |
| *C08L 29/04* | (2006.01) |
| *C08K 3/32* | (2006.01) |
| *C08K 3/105* | (2018.01) |
| *C08L 77/00* | (2006.01) |
| *B32B 27/18* | (2006.01) |
| *B32B 27/30* | (2006.01) |
| *B32B 7/12* | (2006.01) |
| *B32B 25/08* | (2006.01) |
| *B32B 25/14* | (2006.01) |
| *B32B 27/08* | (2006.01) |
| *B32B 27/28* | (2006.01) |
| *B32B 27/32* | (2006.01) |
| *B32B 27/34* | (2006.01) |
| *B32B 27/36* | (2006.01) |

(52) U.S. Cl.
CPC .............. *C08K 5/098* (2013.01); *B32B 7/12* (2013.01); *B32B 25/08* (2013.01); *B32B 25/14* (2013.01); *B32B 27/08* (2013.01); *B32B 27/18* (2013.01); *B32B 27/28* (2013.01); *B32B 27/302* (2013.01); *B32B 27/304* (2013.01); *B32B 27/306* (2013.01); *B32B 27/308* (2013.01); *B32B 27/32* (2013.01); *B32B 27/34* (2013.01); *B32B 27/36* (2013.01); *C08K 3/105* (2018.01); *C08K 3/30* (2013.01); *C08K 3/32* (2013.01); *C08K 3/34* (2013.01); *C08L 29/04* (2013.01); *C08L 77/00* (2013.01); *B32B 2250/02* (2013.01); *B32B 2250/03* (2013.01); *B32B 2250/05* (2013.01); *B32B 2250/24* (2013.01); *B32B 2250/40* (2013.01); *B32B 2264/10* (2013.01); *B32B 2272/00* (2013.01); *B32B 2307/7242* (2013.01); *B32B 2307/7244* (2013.01); *B32B 2435/02* (2013.01); *B32B 2439/46* (2013.01); *B32B 2439/60* (2013.01); *B32B 2439/70* (2013.01); *B32B 2439/80* (2013.01); *C08K 2003/3063* (2013.01); *C08K 2003/326* (2013.01); *C08K 2201/008* (2013.01); *C08L 2201/14* (2013.01); *Y02P 20/582* (2015.11)

(58) Field of Classification Search
CPC .. C08K 5/098; C08K 3/34; C08K 3/32; C08L 29/04
USPC ........................................... 524/381
See application file for complete search history.

(56) References Cited

U.S. PATENT DOCUMENTS 6,353,048 B1 * 3/2002 Onishi ............... B32B 27/18
524/400
9,073,293 B2 7/2015 Yamasaki et al.
(Continued)

FOREIGN PATENT DOCUMENTS

JP 2000-265024 A 9/2000
JP 2000-265025 A 9/2000
(Continued)

OTHER PUBLICATIONS

International Search Report issued with respect to application No. PCT/JP2014/076510, dated Dec. 16, 2014.
(Continued)

*Primary Examiner* — Deve E Valdez
(74) *Attorney, Agent, or Firm* — Greenblum & Bernstein, P.L.C.

(57) ABSTRACT

Provided are: an EVOH resin composition which can exhibit excellent gas-barrier performance after being subjected to a hot water treatment and rarely generates blisters even when being placed under a high-temperature and high-humidity condition; and a multilayered structure including a layer of the resin composition as a gas-barrier layer. A hydrate-formable alkaline earth metal salt having a specific water absorption property, particularly completely or partially dehydrated alkaline earth metal salt of acid, or a mixture thereof. The acid is selected from the group consisting of lactic acid, silicic acid, phosphoric acid, and citric acid. The partially dehydrated alkaline earth metal salt of the salt has a water content of 50 wt % or less.

12 Claims, No Drawings

(56) References Cited

U.S. PATENT DOCUMENTS

| | | | |
|---|---|---|---|
| 2003/0096101 A1* | 5/2003 | Kazeto | C08K 3/0008 428/323 |
| 2007/0275197 A1 | 11/2007 | Chow et al. | |
| 2008/0070052 A1 | 3/2008 | Chow et al. | |
| 2009/0186233 A1 | 7/2009 | Masumoto et al. | |
| 2010/0068435 A1 | 3/2010 | Uradnisheck | |
| 2011/0135950 A1 | 6/2011 | Okamoto et al. | |
| 2012/0128961 A1 | 5/2012 | Yoshida et al. | |
| 2013/0018133 A1 | 1/2013 | Yamasaki et al. | |
| 2013/0065001 A1 | 3/2013 | Kani | |

FOREIGN PATENT DOCUMENTS

| | | |
|---|---|---|
| JP | 2007-314788 A | 12/2007 |
| JP | 2008-75084 A | 4/2008 |
| JP | 2009-191255 A | 8/2009 |
| JP | 2010-59418 A | 3/2010 |
| JP | 2011-225800 A | 11/2011 |
| JP | 2012-179723 A | 9/2012 |
| JP | 2013-127018 A | 6/2013 |
| WO | 2011/118648 A1 | 9/2011 |

OTHER PUBLICATIONS

International Preliminary Report on Patentability issued with respect to application No. PCT/JP2014/076510, dated Apr. 12, 2016.
European Search Report issued with respect to application No. 14852751.8, dated May 17, 2017.

* cited by examiner

SAPONIFIED ETHYLENE-VINYL ESTER COPOLYMER COMPOSITION AND MULTILAYERED STRUCTURE USING SAID COMPOSITION

CLAIM FOR PRIORITY

This application is a Continuation of PCT/JP2014/076510 filed Oct. 3, 2014, and claims the priority benefit of Japanese applications 2013-228217 filed Nov. 1, 2013, and 2013-211980 filed Oct. 9, 2013, the contents of which are expressly incorporated by reference herein in their entireties.

TECHNICAL FIELD

The present invention relates to a saponified ethylene-vinyl ester-based copolymer (hereinafter, referred to as "EVOH resin") composition, and a multilayered structure using the EVOH resin composition. In particular, the invention relates to an EVOH resin composition capable of providing a multilayered structure with excellent gas-barrier performance and after a hot water treatment and reduced the occurrence of blister impairing appearance thereof even after being placed under a high-temperature and high-humidity condition.

BACKGROUND ART

EVOH resin has a crystal part by firmly hydrogen bonding between hydroxyl groups of the molecular chains thereof. Oxygen in atmosphere is prohibited to intrude into the crystal part and therefore EVOH resin can exhibit excellent oxygen barrier performance and other gas-barrier performance. This makes EVOH resin layer utilize a gas-barrier layer of a multilayered film for packaging for food and so on. However, it is known that the gas-barrier performance is deteriorated when a package with a multilayered film employing EVOH resin layer as a gas-barrier layer is subjected to a treatment with hot water for long hours like a retorting treatment. This is supposed that the hot water treatment introduces water into an EVOH resin layer from edges of the multilayered film and thereby breaking hydrogen bonds formed in the EVOH resin molecules, as a result, oxygen in atmosphere could easily intrude into the EVOH resin layer.

It is known that addition of hydrate-formable alkaline earth metal salt as a drying agent to an EVOH resin is useful for avoiding the deterioration of gas-barrier performance caused from a hot water treatment. For example JP2010-59418A (patent document 1) suggests a resin composition comprising an EVOH resin, a partially or completely dehydrated carboxylate hydrate. The patent document 1 discloses that addition of dehydrated disodium succinate hydrate helps retain excellent gas-barrier performance after a hot water treatment.

Partially or completely dehydrated carboxylate hydrate can contain water molecules as crystallization water. Therefore, the moisture entering into an EVOH resin layer during a hot water treatment would be absorbed as crystallization water, which could avoid EVOH resin from breaking hydrogen bonds as well as deteriorating the gas-barrier performance.

In addition, JP2011-225800A (patent document 2) suggests an EVOH resin composition containing a partially or completely dehydrated polyvalent metal sulfate hydrate as a drying agent for not only retaining gas-barrier performance after a hot water treatment but also improving melt-kneading property of EVOH resin. The patent document 2 discloses that a resin composition containing a partially or completely dehydrated magnesium sulfate hydrate still exhibited more excellent gas-barrier performance after a hot water treatment than that containing alkaline metal salt sulfate as shown in Table 1, and that the former exhibited more stable melt viscosity behavior than a resin composition containing metal salt carboxylate as shown in Table 3.

PRIOR ART

Patent Document

[Patent document 1] JP2010-59418
[Patent document 2] JP2011-225800

SUMMARY OF THE INVENTION

Technical Problem to be Solved by the Invention

A multilayered structure in which the resin composition suggested in the patent document 1 or 2 is included as an intermediate layer between polyolefin-based resin layers through an adhesive resin layer still has an excellent gas-barrier performance after a hot water treatment. However, if this multilayered structure is placed under a high-temperature and high-humidity condition, the drying agent would absorb moisture exceeding its capacity to solve in the moisture at a boundary between the resin composition layer and the adhesive resin layer, or the moisture entering into the resin composition layer would be released to become blister upon an environmental change, resulting in separation of the resin composition layer from the adhesive resin layer in worse case.

In the case of a transportation to a remote area by ship or the like vehicle after retort treatment, blister sometimes occurs at a boundary between layers in a multilayered structure packaging a retort food during the transportation, which is similar to a case of being placed under a high-temperature and high-humidity condition. Even when the occurrence of blister does not result in delamination or deterioration of gas-barrier performance of the multilayered structure, the appearance of the packaging for food is impaired due to the blister, which lowers the value of the packaging. For these reasons, the occurrence of blister should be suppressed.

Under these situations, the present invention was made. The object of the invention is to provide an EVOH resin composition capable of providing a gas-barrier layer which still has excellent gas-barrier performance even after a hot water treatment such as retorting treatment and does not raise a problem of blister even when placed under a high-temperature and high-humidity condition for long hours.

Means for Solving the Problems

The inventor focused attention on a water absorption property of hydrate-formable alkaline earth metal salt used as a drying agent, and have studied various hydrate-formable alkaline earth metal salts about the relation between their water absorption properties and the occurrence of blister. Thus the invention has been completed.

An EVOH resin composition of the invention comprises (A) a saponified ethylene-vinyl ester copolymer and (B) a hydrate-formable alkaline earth metal salt satisfying the water absorption property (I) below.

(I) a ratio of $X_5/Y$ is in the range of 0.2 to 2.0 wherein the $X_5$ is an amount of water absorption when (B) hydrate-formable alkaline earth metal salt is placed under a condition of 40° C. and 90% relative humidity for 5 days, and (Y) is a content of crystallization water in maximum hydrate of the (B) hydrate-formable alkaline earth metal salt.

Preferably the hydrate-formable alkaline earth metal salt (B) further satisfies the following water absorption properties (II) and/or (III).

(II) an amount of water absorption (Z) based on 100 g of (B) hydrate-formable alkaline earth metal salt is 10 g or more when the (B) hydrate-formable alkaline earth metal salt is placed under a condition of 40° C. and 90% relative humidity for 24 hours.

(III) local maximum point exists in change of amount of water absorption of the (B) hydrate-formable alkaline earth metal salt while placed under a high-temperature and high-humidity condition.

The preferable alkaline earth metal salt (B) is a completely or partially dehydrated alkaline earth metal salt of acid, or a mixture thereof. The acid is selected from the group consisting of lactic acid, silicic acid, phosphoric acid, and citric acid. The partially dehydrated alkaline earth metal salt has a water content of 50 wt % or less.

According to a preferable embodiment, the ratio (A/B) in weight of the saponified ethylene-vinyl ester copolymer (A) to the hydrate-formable alkaline earth metal salt (B) is in the range between above 50/below 50 and 99/1.

According to another preferable embodiment, the EVOH resin composition further contains (C) polyamide resin and/or (D) dispersing agent.

Another aspect of the invention involves a multilayered structure including at least one layer of the resin composition of the invention.

Effect of the Invention

A multilayered structure including a layer of an EVOH resin composition of the invention still retains gas-barrier performance even after a hot water treatment and rarely generates blisters even when being placed under a high-temperature and high-humidity condition.

MODES FOR CARRYING OUT THE INVENTION

Hereinafter, the present invention will be described, however the description shows merely one preferable embodiment and does not restrict the content of the invention.
<EVOH Resin Composition>

An EVOH resin composition of the invention comprises (A) an EVOH resin, and (B) a hydrate-formable alkaline earth metal salt having a specific water absorption property. These components will be described below.
[(A) EVOH Resin]

An EVOH resin used in the invention is a resin typically obtained by saponifying a copolymer of ethylene and vinyl ester-based monomer (ethylene-vinyl ester copolymer), and is a water-insoluble thermoplastic resin. For the vinyl ester-based monomer, vinyl acetate is commonly used from the viewpoint of economics. Any known copolymerization process, for example, solution polymerization, suspension polymerization, and emulsion polymerization may be employed, solution polymerization using methanol as a solvent is typically employed. The ethylene-vinyl ester copolymer may be saponified by a known method.

Thus produced EVOH resin mainly contains a structural unit derived from ethylene and vinyl alcohol structural unit, and further may contain a remaining unsaponified vinyl ester structural unit in a slight content.

A typical vinyl ester-based monomer is vinyl acetate, which is available on the market and exhibits high efficiency of removing impurity in the production. The other vinyl ester-based monomer includes, for instance, aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate; aromatic vinyl esters such as vinyl benzoate, and so on. Aliphatic vinyl ester having usually from 3 to 20 carbon atoms, preferably from 4 to 10 carbon atoms, particularly preferably from 4 to 7 carbon atoms, may be used. These may be used alone or a combination thereof if necessary.

Typical raw material of ethylene and vinyl ester-based monomer is naphtha and other material derived from petroleum. Also, a material derived from natural gas such as shale gas, sugar or starch contained in sugar cane, sugar beet, corn, and potato, and defecated material derived from cellulose contained in rice, wheat, millet and other plant may be used as a raw material for those monomers.

The content of ethylene unit in the EVOH resin is in the range of usually 20 to 60 mol %, preferably 25 to 50 mol %, particularly preferably 25 to 35 mol %, as a measurement value according to ISO14663. If the ethylene content is unduly low, the gas-barrier performance under a high humidity condition and melt-molding property tends to be lowered. If the ethylene content is unduly high, insufficient gas-barrier performance might be provided.

The saponification degree of the vinyl ester component in the EVOH resin is in the range of usually 90 to 100 mol %, preferably 95 to 100 mol %, particularly preferably 99 to 100 mol %, as a measurement value according to JIS K6726 with the proviso that EVOH resin is dissolved homogenously in water/methanol solvent. If the saponification degree is unduly low, the gas-barrier performance, thermostability, and humidity resistance tend to be lowered.

Melt flow rate (MFR) of the EVOH resin at 210° C. under a load of 2,160 g is usually from 0.5 to 100 g/10 min, preferably from 1 to 50 g/10 min, particularly preferably from 3 to 35 g/10 min. If the EVOH resin has unduly high MFR, the EVOH resin tends to become unstable in film production. If the EVOH resin has unduly low MFR, the EVOH resin tends to have difficulty in melt-extruding due to relatively high viscosity.

The EVOH resin used in the invention may further contain a structural unit derived from the following comonomer in the range not inhibiting the effect of the invention, for example 10 mol % or less.

Examples of the comonomer include olefins such as propylene, 1-butene and isobutene; hydroxy group-containing α-olefins such as 3-buten-1-ol, 3-buten-1,2-diol, 4-penten-1-ol, and 5-hexen-1,2-diol, or a derivative such as ester thereof and acylated product; unsaturated acids such as acrylic acid, methacrylic acid, crotonic acid, phthalic acid (or anhydride), maleic acid (or anhydride), itaconic acid (or anhydride) or salt thereof, or mono- or di-alkyl ester having from 1 to 18 carbon atoms; acrylamides such as acrylamide, N-alkyl acrylamide having from 1 to 18 carbon atoms, N,N-dimethylacrylamide, 2-acrylamide propanesulfonic acid or salt thereof, acrylamide propyl dimethylamine or salt thereof or acrylamides such as quaternary salt thereof; methacrylamides such as methacrylamide, N-alkylmethacrylamide having from 1 to 18 carbon atoms, N,N-dimethylmethacrylamide, 2-methacrylamide propanesulfonic acid or salt thereof, methacrylamide propyl dimethylamine or salt thereof or quaternary salt thereof, N-vinylamides such as N-vinylpyrrolidone, N-vinylformamide, and N-vinylacetamide; vinyl cyanides such as acrylonitrile and methacrylonitrile; vinyl ethers such as alkyl vinyl ether having from 1 to 18 carbon atoms, hydroxyalkyl vinyl ether, and alkoxyalkylvinyl ether; vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol, and dimethoxy allyl alcohol; trimethyl-(3-acrylamide-3-dimethylpropyl)-ammonium chloride, acrylamide-2-methylpropanesulfonic acid and so on.

In addition, post-modified EVOH resins by urethanation, acetalization, cyanoethylation, or oxyalkylenation may be used.

In particular, an EVOH resin obtained by copolymerizing hydroxy group-containing α-olefins, especially EVOH resin having 1,2-diol in a side chain thereof is preferred, from the viewpoint of secondary moldability.

The EVOH resin having 1,2-diol in a side chain thereof contains 1,2-diol structural unit in a side chain as shown in the structural unit (1) below.

[formula 1]

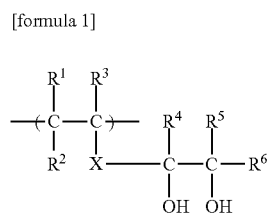

(1)

In the formula (1), $R^1$, $R^2$, and $R^3$ represent hydrogen atom or an organic group independently, and X represents single bond or a binding chain, and $R^4$, $R^5$, and $R^6$ represent hydrogen atom or an organic group independently.

Non-limiting examples of the organic group in the 1,2-diol structural unit of the formula (1) include saturated hydrocarbon group such as methyl, ethyl, n-propyl, isopropyl, n-butyl, isobutyl, and tert-butyl; aromatic hydrocarbon group such as phenyl and benzyl group; halogen, hydroxyl, acyloxy, alkoxycarbonyl, carboxyl, sulfonic acid group, and so on.

$R^1$ to $R^3$ each is preferably a saturated hydrocarbon group having from usually 1 to 30 carbon atoms, particularly 1 to 15 carbon atoms, further particularly 1 to 4 carbon atoms, or hydrogen atom. Of these, hydrogen atom is most preferred. $R^4$ to $R^6$ each is an alkyl group having from usually 1 to 30 carbon atoms, preferably 1 to 15 carbon atoms, further preferably 1 to 4 carbon atoms, or hydrogen atom. Of these, hydrogen atom is most preferred. In particular, it is most preferred that all of $R^1$ to $R^6$ are hydrogen.

X in the structural unit of the formula (1) is typically single bond.

X may be a binding chain unless the effect of the invention is inhibited. Non-limiting examples of the binding chain include hydrocarbon chain such as alkylene, alkenylene, alkynylene, phenylene, naphthylene, wherein these hydrocarbons may be substituted with halogen such as fluorine, chlorine, or bromine, as well as ether bond-containing group such as —O—, —(CH$_2$O)m-, —(OCH$_2$)m-, and —(CH$_2$O)mCH$_2$—; carbonyl group containing chain such as —CO—, —COCO—, —CO(CH$_2$)mCO—, and —CO(C$_6$H$_4$)CO—; sulfur atom-containing group such as —S—, —CS—, —SO—, and —SO$_2$—; nitrogen atom-containing group such as —NR—, —CONR—, —NRCO—, —CSNR—, —NRCS—, and —NRNR—; hetero such as phosphorus atom-containing group such as —HPO$_4$—; silicon atom-containing group such as —Si(OR)$_2$—, —OSi(OR)$_2$—, and —OSi(OR)$_2$—; titanium atom-containing group such as —Ti(OR)$_2$—, —OTi(OR)$_2$—, and —OTi(OR)$_2$O—; aluminum-containing group such as —Al(OR)—, —OAl(OR)—, and —OAl(OR)O—, wherein R is independently a substituting group, and preferably hydrogen atom or an alkyl group, m is a natural number selected from usually 1 to 30, preferably 1 to 15, particularly preferably 1 to 10. Among them, —CH$_2$OCH$_2$—, and hydrocarbon chain having from 1 to 10 carbon atoms are preferred from the viewpoint of stability in production and usage. Hydrocarbon chain having from 1 to 6 carbon atoms, especially 1 carbon atom is particularly preferred.

The most preferable structure of 1,2-diol structural unit represented by the formula (1) is a structure where all $R^1$ to $R^6$ are hydrogen atoms and X is single bond, that is the structural unit of the formula (1 a) below.

[formula 1a]

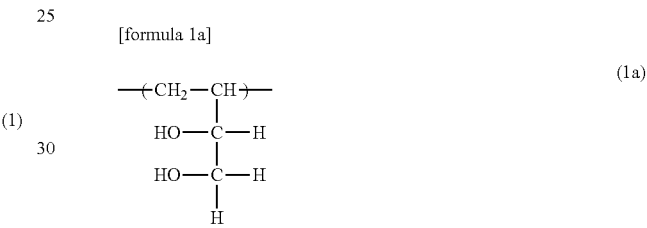

(1a)

In the case of containing 1,2-diol structural unit of the formula (1), the content of the structural unit is in the range of usually 0.1 to 20 mol %, preferably 0.1 to 15 mol %, particularly 0.1 to 10 mol %.

A combination of different types of EVOH resins may be used in the invention. The combination includes EVOH resins different in 1,2-diol content of the structural unit of the formula (1), saponification degree, polymerization degree, and other unit derived from a comonomer, and so on.

The EVOH resin used in the invention may contain, in the range not inhibiting the effect of the invention, a conventional additive for EVOH resin including, for example, heat stabilizer, antioxidant, antistatic agent, colorant, ultraviolet absorber, lubricant, plasticizer, light stabilizer, surfactant, insecticide, drying agent, antiblocking agent, fire retardant, crosslinking agent, curing agent, foaming agent, crystal forming agent, anti-fogging agent, biodegradable agent, silane coupling agent, oxygen scavenger and the like.

As the heat stabilizer, an organic acid such as acetic acid, propionic acid, butyric acid, lauric acid, stearic acid, oleic acid, or behenic acid, or alkaline metal (e.g. sodium, potassium) salt, alkaline earth metal (e.g. calcium, magnesium) salt, or zinc salt thereof; or an inorganic acid such as sulfuric acid, sulfurous acid, carbonic acid, phosphoric acid, or boric acid, or alkali metal (e.g. sodium, potassium) salt, alkaline earth metal (e.g. calcium, magnesium) salt, or zinc salt thereof, or other additives may be used for the purpose of improving thermal stability in melt-molding and other physical properties. Of these, acetic acid, boron compound such as boric acid or salt thereof, acetate or phosphate is preferably used.

In the case of adding acetic acid, its amount is usually from 0.001 to 1 part by weight, preferably from 0.005 to 0.2 part by weight, particularly preferably from 0.010 to 0.1 part by weight, based on 100 parts of EVOH resin. If the amount of acetic acid is unduly low, sufficient effect of acetic acid would not be obtained. On the contrary, if the amount of acetic acid is unduly high, the production of film having uniformity would be difficult In the case of adding boron compound, its amount is usually from 0.001 to 1 part by weight, preferably from 0.002 to 0.2 part by weight, particularly preferably from 0.005 to 0.1 part by weight, in terms of weight of boron, based on 100 parts by weight of EVOH resin. The weight of boron is determined by ICP emission analysis after incineration of the boron compound. If the amount is unduly low, sufficient effect of boron compound would not be obtained. On the contrary, if the amount is unduly high, the production of film having uniformity would be difficult.

The amount of metal salt of acetic acid, phosphoric acid or hydrogenphosphoric acid is usually from 0.0005 to 0.1 part by weight, preferably from 0.001 to 0.05 part by weight, particularly preferably from 0.002 to 0.03 part by weight, in terms of weight of metal based on 100 parts by weight of EVOH resin. The weight of metal is determined by ICP emission analysis after incineration of the metal salt. If the amount is unduly low, sufficient effect of the metal salt would not be obtained. On the contrary, if the amount is unduly high, the production of film having uniformity would be difficult. In the case of adding two or more of salts to EVOH resin, the total amount is desired to fall in the above range.

A method for adding the acetic acid, boron compound, metal salt of acetic or phosphoric acid to EVOH resin is not particularly limited. Examples of the method are as follows: i) a method of allowing porous precipitate of EVOH resin having a water content of 20 to 80 wt % to contact with an aqueous solution of the additional compound and contain the additional compound in the porous precipitate, followed by drying the resultant; ii) a method of allowing homogenous EVOH resin solution (solvent: water/alcohol etc.) to contain additional compound, and extruding the resulting solution into coagulation bath in the form of strand, and cutting the formed strand to obtain pellets, followed by drying the pellets; iii) a method of mixing EVOH resin with additional compound in a lump, and melt-kneading with extruder or a like apparatus; iv) a method of neutralizing alkali such as sodium hydroxide and potassium hydroxide used in saponification process with organic acids such as acetic acid during the production of EVOH resin, and rinsing to adjust the content of residue organic acids or salt as a by-product.

The methods i), ii) and iv) are preferred because these methods would notably provide the effect of the invention. The methods i) and ii) are excellent in dispersibility of the additional compound. The method iv) is appropriate in the case of adding organic acid or salt thereof.

[(B) Hydrate-formable Alkaline Earth Metal Salt]

The hydrate-formable alkaline earth metal salt (B) used for the invention has a property of taking in water molecule as crystallization water and further satisfies water absorption property (I), preferably water absorption property (II) and/or (III) below.

Water Absorption Property (I):

The ratio ($X_5/Y$) is in the rage of of 0.2 to 2.0, preferably 0.5 to 2.0, more preferably 0.75 to 2.0, wherein Y is a content of crystallization water in maximum hydrate of the hydrate-formable alkaline earth metal salt (B), and $X_5$ is an amount of water absorption per 100 g hydrate-formable alkaline earth metal salt (B) when the alkaline earth metal salt (B) is placed under the condition of 40° C. and 90% relative humidity for 5 days.

The maximum hydrate is a hydrate incorporating water molecule at maximum hydration number. The content of crystallization water, Y (g), is an amount of water which 100 g anhydrous hydrate-formable alkaline earth metal salt can incorporate water in crystalline frame works thereof. Such a content of crystallization water (Y) is a specific depending on types of alkaline earth metal salts and calculated by the formula below.

$$Y=(\text{hydration number at maximum} \times 18)/(\text{molecular weight of anhydride}) \times 100$$

For example, in the case that calcium lactate ($C_6H_{10}CaO_6$: molecular weight of 218) is used as the hydrate-formable alkaline earth metal salt, the calculation is conducted as follows. Maximum hydrate of calcium lactate is pentahydrate, and Y is determined by the calculation below. As a calculation result, Y=41.

$$Y=(5\times18)/218\times100=\text{about } 41$$

The content of crystallization water Y of the maximum hydrate corresponds to a water content of the hydrate-formable alkaline earth metal salt in the form of maximum hydrate. The content Y is an indicator for maximum amount of water absorption by alkaline earth metal salt (anhydride) used as the component (B), as well as an indicator for an amount of water held by the alkaline earth metal salt among water intruded into EVOH resin. The more moisture held by the alkaline earth metal salt among water which the EVOH resin composition takes in, the less deterioration of oxygen barrier performance the multilayered structure would exhibit after a hot water treatment. Accordingly, the lager Y is the better. Preferable Y is 30 g or more, further 40 g or more, yet further 50 g or more.

On the other hand, regarding the hydrate-formable alkaline earth metal salt, maximum hydrate thereof is not always most stable. The hydrate capable of existing in the most stable condition, i.e. most stable hydrate sometimes has less crystallization water than the maximum hydrate. For example, regarding trimagnesium dicitrate, nonahydrate is the most stable regardless of tetradecahydrate as its maximum hydrate.

The water absorption amount $X_5$, is an amount of water absorption (unit: g) of 100 g hydrate-formable alkaline earth metal salt (B) when dehydrated hydrate-formable alkaline earth metal salt (B), i.e. anhydride is placed under the condition of 40° C. and 90% relative humidity for 5 days, and is calculated by the following formula.

$$X_5=(\text{amount of water absorption for 5 days})/(\text{initial weight})\times100$$

The weight amount of water absorption for 5 days is obtained by the calculation that the weight after 5 days minus the initial weight.

The "initial weight" in the above formula corresponds to the weight of metal salt before actual use.

The "initial weight" and "amount of water absorption for 5 days" used in the calculation are actual measurement values, and obtained by weighing with mass measuring instrument such as electronic scales. Those values depend on types of alkaline earth metal salt as well as manufacturing method, presence or absence of crystallization water, chemical condition, and the like.

In the case of using anhydrous of hydrate-formable alkaline earth metal salt as the component (B), theoretical water content should be 0 g. However, the initial weight employed in the formula include a trace amount of moisture, because the initial weight is determined by actually weighing the substance in equilibrium condition, i.e. completely dehydrated compound, with use of thermogravimetric analyzer ("Pyris 1 TGA" from Perkin Elmer Co., Ltd.) or the like analyzer.

The amount of water absorption $X_5$ is usually from 10 to 200 (g), preferably from 20 to 100 (g), particularly preferably from 30 to 75 (g). Alkaline earth metal salt having a large amount of water absorption $X_5$ tends to take in moisture exceeding necessary amount for forming stable hydrate, and therefore, blister tends to generate when the multilayered structure is placed under a high humidity condition. On the other hand, alkaline earth metal salt having a small amount of water absorption $X_5$, which holds merely small amount of moisture intruded into EVOH resin, tends to provide insufficient gas-barrier performance after a hot water treatment or retorting treatment.

The ratio $X_5/Y$, which is a ratio of water absorption amount $X_5$ to crystallization water content Y as defined above, indicates a rate of water absorption amount for 5 days to water amount stably held by hydrate-formable alkaline earth metal salt used as the component (B). The ratio is an indicator relating the occurrence of blister when a multilayered structure is placed under a high humidity condition. Alkaline earth metal salt having $X_5/Y$ within the above range has an appropriate water-absorbing capacity and does not absorb extra water. While hydrate-formable alkaline earth metal salt having unduly large $X_5/Y$ takes in moisture exceeding the water-absorbing capacity assuring stable condition of the alkaline earth metal salt, and therefor blister occur easily due to the extra water absorption. On the contrary, hydrate-formable alkaline earth metal salt having unduly small $X_5/Y$ has small capacity for holding moisture intruded into the EVOH resin, and therefor reducing the effect of suppressing that moisture intruded into EVOH resin deteriorates gas-barrier performance.

Water absorption property (II): initial speed of water absorption (Z) corresponding to an amount of water absorption 24 hours after placed under the condition of 40° C. and 90% relative humidity is 10 (g) or more, preferably 30 (g) or more, further preferably 50 (g) or more.

Z is expressed as an amount of water absorption (g) while 100 g hydrate-formable alkaline earth metal salt (B) is placed under the condition of 40° C. and 90% relative humidity for 24 hours.

The alkaline earth metal salt having relatively low initial speed of water absorption Z has insufficient capacity for water intruded into EVOH resin, and tends to provide insufficient gas-barrier performance after a hot water treatment or retorting treatment.

Water absorption property (III): a local maximum point exists in change of amount of water absorption while placed under a high-temperature and high-humidity condition.

The high-temperature and high-humidity condition is a condition of relatively high humidity and a temperature higher than the normal temperature but lower than water evaporation temperature. For example, a condition of 40° C. and 90% relative humidity is a condition of a high-temperature and high-humidity condition.

The case of existence of local maximum point is a case where increasing tendency changes to decreasing tendency in change of an amount of water absorption for 6 days placed under high-temperature and high-humidity condition such as 40° C. and 90% relative humidity condition.

For example, in the case that the water absorption amount (X) is measured every 24 hours during placed, the water absorption amount Xn, which is water absorption amount for n days placed, is determined by the calculation: (weight at n days)–(initial weight). The water absorption amount at the next day (n+1 days) denotes $X_{n+1}$. If the $X_{n+1}$ is less than Xn, a local maximum point exists.

Accordingly, the water absorption property (III) means that hydrate-formable alkaline earth metal salt absorbs water upto the local maximum point and then loses water once trapped. This means that the hydrate-formable alkaline earth metal salt can suppress excessive water absorption after absorbing an intended amount of water. According to the water absorption property (III), hydrate-formable alkaline earth metal salt can avoid self-dissolution in water absorbed by itself. If a stable hydration number is lower than the maximum hydration number in the case of a hydrate-formable alkaline earth metal salt, the hydrate-formable alkaline earth metal salt absorbs water up to the state having largest hydration number and thereafter loses water once absorbed until arriving at the stable state. Thus the amount of water absorption would be adjusted.

A hydrate-formable alkaline earth metal salt satisfying the aforementioned water absorption properties can trap water intruded in the composition, and thereby suppressing the deterioration of gas-barrier performance of EVOH resin after a hot water treatment. In addition, the hydrate-formable alkaline earth metal salt can avoid absorbing extra water exceeding absorption capacity thereof, or lose extra water after absorbing excessive amount of water to attain the stable state. As a result, the multilayered structure can maintain excellent appearance with reduced occurrence of blister even when the multilayered structure is exposed to high-temperature and high-humidity for long hours.

Hydrate-formable alkaline earth metal salt satisfying the aforementioned water absorption properties includes, for instance, carboxylates such as lactate (e.g. calcium lactate [pentahydrate]), citrate (e.g. calcium citrate [tetrahydrate], trimagnesium dicitrate [tetradecahydrate], magnesium hydrogen citrate [pentahydrate]); silicate (magnesium silicate [pentahydrate]), phosphate (trimagnesium phosphate [octahydrate]), carbonate (basic magnesium carbonate [heptahydrate]) and so on. The term in brackets indicates the hydrate having maximum hydration number. These hydrate-formable alkaline earth metal salt may be used alone or a combination thereof.

The hydrate-formable alkaline earth metal salt used in the invention is an alkaline earth metal salt such the stable state has hydration number of usually 1 to 20, preferably 3 to 18, particularly preferably 5 to 15. In general, the smaller crystallization water content the stable alkaline earth metal salt has, the lower the capacity absorbing water.

A completely or partially dehydrated compound of such alkaline earth metal salt maximum hydrate may be used for a drying agent as the component (B). In this case, anhydrous alkaline earth metal salt in which crystallization water is 0, and partially hydrated alkaline earth metal salt which contains crystallization water less than stable hydrate are used. Partially dehydrated or partially hydrated alkaline earth metal salt can satisfy the aforementioned water absorption properties as long as they have crystallization water content less than 50%, preferably 30% or less, particularly 10% or less based on the maximum hydration content.

Anhydrous or partially hydrated hydrate-formable alkaline earth metal salt used as a component (B) may be produced by completely or partially dehydrating an alkaline earth metal salt hydrate. Alternatively a commerciallly available alkaline earth metal salt anhydrate or partially hydrate may be used. In short, any hydrate-formable alkaline earth metal salt satisfying the aforementioned water absorption property (I), preferably water absorption properties (II) and (III) or at least one of them may be used.

The actual water content of the anhydrous hydrate-formable alkaline earth metal salt (i.e. completely dehydrated alkaline earth metal salt) or partially hydrate thereof (i.e. partially dehydrated alkaline earth metal salt) is not always consistent with theoretical content calculated based on its chemical formula. For example, theoretical amount of water absorption of anhydrous alkaline earth metal salt (i.e. completely dehydrated compound) is 0 because of no crystallization water, however, the water content determined through thermogravimetric analysis is often more than 0 wt %. In another example, the water content of completely dehydrated trimagnesium dicitrate determined through thermogravimetric analysis falls in the range of about 0 to 10 wt %. This seems to result from water absorption of the anhydrate. Regarding a completely dehydrated compound, the water content determined through thermogravimetric analysis is preferably in the range of about 0 to 5 wt % even when the completely dehydrated compound absorbs moisture in the atmosphere.

An actual water content of the compound may be determined by, for example, thermogravimetric analysis instrument ("Pyris 1 TGA" from Perkin Elmer Co., Ltd.). The measurement value of water content is percentage of water amount to the weight of the compound, which is percentage of water amount quantified at the time of no change is arrived in monitoring the change of weight with time.

Among the aforementioned alkaline earth metal salts, completely dehydrated alkaline earth metal salts selected from the group consisting of calcium lactate, magnesium silicate, trimagnesium phosphate, and alkaline earth metal salt of citric acid are preferably used from the viewpoint of gas-barrier performance after a hot water treatment. Calcium lactate is particularly preferably used because of excellent dispersibility in EVOH resin. Alkaline earth metal salt of citric acid, in particular, completely dehydrated magnesium citrate satisfies the water absorption property (III), and can impart excellent gas-barrier performance after a hot water treatment.

A common hydrate-formable alkaline earth metal salt is in the form of powder, which has a particle-size distribution of 50 volume % or more, preferably 80 volume % or more, particularly preferably 95 volume % or more of particles passing through 120 mesh screen, in terms of determining according to ASTM E11-04. The particle-size distribution provides an indication of dispersibility in EVOH resin. The higher percentage of particles passing through 120 mesh screen indicates excellent in dispersibility. Unduly low percentage of particles passing through 120 mesh screen tends to impair appearance of the final multilayered structure.

The hydrate-formable alkaline earth metal salt of citric acid having aforementioned properties can suppress exceeding water absorption under a high-temperature and high-humidity condition with maintaining high water absorption capacity. A resin composition comprising such hydrate-formable alkaline earth metal salt and EVOH resin is layered for an intermediate layer, which is sandwiched by polyolefin-based resin layers through adhesive resin layer to produce a multilayered structure. Even when the multilayered structure thus produced is placed under a high-temperature and high-humidity condition, self-dissolution in water by absorbing exceeding water or moisture transferring at the interface between resin composition layer and adhesive resin layer in the multilayered structure can be suppressed. This means a multilayered structure having excellent appearance without faults like blister can be produced.

According to the invention, hydrate-formable alkaline earth metal salt (B) is preferably dispersed in EVOH resin (A).

The resin composition of the invention has a content ratio in weight of EVOH resin (A)/hydrate-formable alkaline earth metal salt (anhydride) (B), i.e. weight ratio (A/B), is not particularly limited but is in the range usually between above 50/below 50 and 99/1 (i.e. more than 50/50 but 99/1 or less), preferably between 70/30 and 97/3, particularly preferably between 85/15 and 92/8. The unduly high ratio tends to reduce the effect of trapping moisture intruding into EVOH resin (A), and therefore would not provide sufficient gas-barrier performance after a hot water treatment or retorting treatment. On the contrary, unduly low ratio cannot form the phase of EVOH resin in the resin composition, resulting in sufficient for gas-barrier performance. Relatively small value of A/B means that the content of alkaline earth metal salt is large, which lowers fluidity and extrusion moldability of the resin composition.

[(C) Other Thermoplastic Resin]

The EVOH resin composition of the invention may usually contain a thermoplastic resin other than EVOH resin (A), which is called as "(C) other thermoplastic resin", in an amount of 30 wt % or less based on the weight of EVOH resin (A).

Examples of the other thermoplastic resin (C) include homo- or co-polymer of olefins such as linear low density polyethylene, low density polyethylene, medium density polyethylene, high density polyethylene, ethylene-vinyl acetate copolymer, ionomer, ethylene-propylene copolymer, ethylene-α-olefin having from 4 to 20 carbon atoms copolymer, ethylene-acrylate copolymer, polypropylene, propylene-α-olefin having from 4 to 20 carbon atoms, polybutene, and polypentene; polycyclic olefin, or graft modified thereof in which these homo- or copolymer is graft modified with unsaturated carboxylic acid or ester thereof, and other polyolefin-based resins in wide meaning; polystyrene-based resin, polyester, polyamide, copolyamide, polyvinyl chloride, polyvinylidene chloride, acryl-based resin, vinyl ester-based resin, polyester-based elastomer, polyurethane-based elastomer, polystyrene-based elastomer, chlorinated polyethylene, chlorinated polypropylene, and other thermoplastic resin.

A typical raw material of the (C) other thermoplastic resin includes naphtha and other material derived from petroleum. Also, a material derived from natural gas such as shale gas, sugar or starch contained in sugar cane, sugar beet, corn, and potato, and defecated material derived from cellulose contained in rice, wheat, millet and other plant may be used as a raw material for the other thermoplastic resin (C).

In particular case that the resin composition of the invention is used for a multilayered structure packaging for food, the resin composition preferably contain polyamide-based resin because the polyamide-based resin is effective to prevent the elution of EVOH resin at the end of package by a hot water treatment. Since polyamide-based resin has amide bond active to OH group and/or ester group in EVOH resin, network structure can be formed, thereby preventing the elution of EVOH resin caused from a hot water treatment. Accordingly, a preferable resin composition used for packaging for retort food or boil food contain polyamide-based resin.

Any known polyamide-based resin may be used.

Specific examples of the polyamide-based resin include polycapramide (nylon 6), poly-ω-aminoheptanoic acid (nylon 7), poly-ω-aminononanoic acid (nylon 9), polyundecanamide (nylon 11), polylauryl lactam (nylon 12) and the like homopolymers. Examples of copolyamide-based resin include polyethylenediamine adipamide (nylon 26), poly (tetramethylene adipamide) (nylon 46), poly(hexamethylene adipamide) (nylon 66), poly(hexamethylene sebacamide) (nylon 610), poly(hexamethylene dodecamide) (nylon 612), poly(octamethylene adipamide) (nylon 86), poly(decamethylene adipamide) (nylon 108), caprolactam/lauryl lactam copolymer (nylon 6/12), caprolactam/ω-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide/hexamethylene diammonium adipate copolymer (nylon 26/66), caprolactam/hexamethylene diammonium adipate/hexamethylene diammonium sebacate copolymer (nylon 66/610), ethylene ammonium adipate/hexamethylene diammonium adipate/hexamethylene diammonium sebacate copolymer (nylon 6/66/610), and the like aliphatic copolyamide; poly(hexamethylene isophthalamide), poly(hexamethylene terephthalamide), poly(metaxylylene adipamide), hexamethylene isophthalamide/terephthalamide copolymer, poly-p-phenylene terephthalamide, poly-p-phenylene-3,4'-diphenyl ether terephthalamide, and the like aromatic polyamide; amorphous polyamide, polyamide-based resin modified with aromatic amine such as methylenebenzylamine or metaxylenediamine; metaxylylene diammonium adipate. Terminal-modified polyamide-based resin in which the aforementioned polyamide-based resin is modified at the terminal thereof may be included. The terminal-modified polyamide-based resin is preferably used.

A common terminal-modified polyamide-based resin is polyamide-based resin whose terminal is modified with hydrocarbon group having from 1 to 22 carbon atoms, and commercially' available. In particular, a terminal-modified polyamide-based resin satisfying the following equation is preferably used, wherein [a] denotes the number of terminal COOH group, [b] denotes the number of terminal CONR$^{10}$R$^{20}$ group wherein R$^{10}$ represents a hydrocarbon group having from 1 to 22 carbon atoms and R$^{20}$ represents hydrogen atom or a hydrocarbon group having from 1 to 22 carbon atoms.

$$100 \times b/(a+b) \geq 5$$

A common terminal-modified polyamide-based resin is N-substituted amide where a carboxyl group of a common native polyamide-based resin is modified with terminal control agent, and has 5% or more modification rate based on the total number of carboxyl groups contained in the polyamide-based resin before the modification. The terminal-modified polyamide-based resin having unduly low modification rate has relatively many carboxyl groups, which react with EVOH resin during melt-molding to generate gel or the like matter, resulting in impaired appearance of the film as a product. The terminal-modified polyamide-based resin may be produced by a method disclosed in, for instance, JP8-19302B.

As the terminal control agent, amines capable of reacting with carboxyl group may be used for reducing the number of carboxyl group in the polyamide-based resin. The amine may be monosubstituted amine represented by HNR$^{10}$R$^{20}$ wherein R$^{20}$ is hydrogen atom or disubstituted amine represented by HNR$^{10}$R$^{20}$. HNR$^{10}$R$^{20}$ having an organic group for R$^{10}$ and/or R$^{20}$ may be a hydrocarbon group without carboxyl group, and may contain hydroxyl, amino, carbonyl, and other functional group within the content not inhibiting the effect of the invention. Aliphatic hydrocarbon group is preferred. Specifically, R$^{10}$ and R$^{20}$ each is a hydrocarbon group having from 1 to 22 carbon atoms, preferably from 5 to 20 carbon atoms, and R$^{10}$ and R$^{20}$ may be the same or different from each other.

A preferable terminal-modified polyamide-based resin contains small content of remained unmodified carboxyl group at terminal. A quantified content of the unmodified terminal carboxyl group by preparing a solution of polyamide resin dissolved in benzyl alcohol and titrating the solution with 0.1N sodium hydroxide aqueous solution is usually from 0 to 50 μeq, preferably from 0 to 30 μeq, particularly preferably from 0 to 25 μeq, based on 1 g of the polymer, in terms of molar equivalent per polymer 1 g. lithe content of the unmodified terminal carboxyl group is unduly high, gel or the like matter generates in the film production, which would provide a film with inferior appearance and lowered retortability. Unduly low content of the unmodified terminal carboxyl group causes to lowered productivity, however, the physical properties are not almost affected. Accordingly, unmodified terminal carboxyl group may be remained in such a small content of usually 5 to 50 μeq, preferably 10 to 30 μeq, particularly 15 to 25 μeq, per 1 g of the polymer.

Not only terminal carboxyl group, but also terminal NH$_2$ group in the unmodified polyamide-based resin is preferably modified with hydrocarbon group having from 1 to 22 carbon atoms. The terminal control agent used for this modification is carboxylic acid capable of reacting with amino group for reducing the number of amino groups contained in the polyamide-based resin. The carboxylic acid may be monocarboxylic acid represented by RCOOH wherein R is a hydrocarbon group having from 1 to 22 carbon atoms.

Such terminal-modified polyamide-based resin has a melting point of usually 200 to 250° C., preferably 200 to 230° C.

In the case of using polyamide-based resin as the other thermoplastic resin (C), the content ratio in weight, EVOH resin/polyamide-based resin, is in the range of usually 99/1 to 70/30, preferably 97/3 to 75/25, particularly preferably 95/5 to 85/15. Unduly high content of polyamide resin would provide insufficient long-run moldability and gas-barrier performance. Unduly low content of polyamide resin would reduce the effect of suppressing the elution of EVOH resin after a hot water treatment.

The content ratio in weight of hydrate-formable alkaline earth metal salt (B) to polyamide-based resin (C) is in the range of usually 95/5 to 5/95, preferably 70/30 to 30/70, particularly preferably 60/40 to 40/60 wherein the content of alkaline earth metal salt employs the content of completely dehydrated one. If the content of the polyamide resin is unduly large, gas-barrier performance after a hot water treatment would be deteriorated. If the content of the polyamide resin is unduly small, EVOH resin would be eluted during a hot water treatment.

[(D) Dispersing Agent]

According to the invention, a preferable resin composition contain further a dispersing agent.

A dispersing agent conventionally used in the resin composition may be used. Examples of the dispersing agent include higher fatty acid (e.g. lauric acid, myristic acid, palmitic acid, stearic acid, behenic acid, oleic acid etc.), higher fatty acid metal salt (aluminum salt, calcium salt, zinc salt, magnesium salt, and barium salt of higher fatty acid such as stearic acid and so on), higher fatty acid ester (glyceride, methyl ester, isopropyl ester, butyl ester, and octyl ester of higher fatty acid), higher fatty acid amide (saturated aliphatic amide such as stearamide and behenic acid amide, and unsaturated fatty acid amide such as oleic amide, and erucic amide, bis-fatty acid amide such as ethylene bis stearamide, ethylene bis oleic amide, ethylene bis erucic amide, and ethylene bis lauric amide), low molecular weight polyolefin such as low molecular weight polyethylene and low molecular weight polypropylene each having molecular weight of about 500 to 10,000, acid-modified polyolefin, higher alcohol, ester oligomer, and fluorized ethylene resin. Among them, higher fatty acid and/or a metal salt thereof, ester, or amide is preferred, and alkaline earth metal salt of stearic acid and/or glyceride of higher fatty acid is further preferred.

Addition of hydrate-formable alkaline earth metal salt (B) tends to increase torque during kneading the resin composition. Also, the addition of the polyamide resin effective for preventing elution of EVOH resin tends to increase torque during kneading the resin composition. Such tendency of viscosity increase is not preferable because of insufficient long-run property in the production of its pellets as well as extrusion molding of film and the like. However, addition of dispersing agent can suppress the tendency of viscosity increase. This is supposed that metal salt of higher fatty acid, especially metal stearate could act like a lubricant to hydrate-formable metal salt in the resin composition and could make an effect on the suppression of viscosity increase.

The suppression of viscosity increase or excellent long-run property of EVOH resin composition by addition of dispersing agent can be exhibited in the presence of polyamide resin effective for preventing elution of EVOH resin. Accordingly, in the case of adding polyamide resin to the resin composition, further addition of dispersing agent can improve the productivity of multilayered structure excellent in appearance without blister after placed under a high-temperature and high-humidity condition.

Such dispersing agent is contained in the resin composition in a content of preferably 0.01 to 5 wt %, more preferably 0.1 to 5 wt %, further more preferably 0.5 to 3 wt %, but not limited thereto.

[(E) Other Additive]
(E-1) Plate-like Inorganic Filler

EVOH resin composition of the invention may further contain a plate-like inorganic filler for improving its gas-barrier performance.

Examples of the plate-like inorganic filler include kaolin, mica, smectite, talc, and so on. Kaolin is plate-like particle of hydrous aluminum silicate as a main component. Mica and smectite are layered silicic acid mineral. Talc consists of magnesium hydroxide and silicate. A preferable plate-like inorganic filler is kaolin. Types of kaolin and calcination are not limited, but calcined kaolin is preferred.

These plate-like inorganic fillers can further improve gas-barrier performance of the resin composition. Since the plate-like inorganic filler has a layered structure, completely or partially dehydrated hydrate-formable alkaline earth metal salt can intrude between layers of the plate-like inorganic filler during kneading. This can avoid destruction or fragmentation of the plate-like inorganic filler upon contacting or colliding. In addition, the plate-like inorganic filler is easy to be oriented in planar direction in film production. The oriented plate-like inorganic filler in planar direction could block oxygen entry into a resin composition layer.

The amount of the plate-like inorganic filler to be added is not particularly limited, but is selected from the range of usually 1 to 20 wt %, preferably 3 to 20 wt %, more preferably 5 to 15 wt %, based on the weight of EVOH resin.

(E-2) Oxygen Scavenger

The EVOH resin composition of the invention may further contain oxygen scavenger for improving gas-barrier performance after a hot water treatment (e.g. retorting treatment).

The oxygen scavenger is a compound or composite which traps oxygen faster than the packaged substance. Specifically, the oxygen scavenger includes inorganic-based oxygen scavenger, organic oxygen scavenger, and composite type oxygen scavenger which is an assembly of inorganic catalyst and organic compound.

The inorganic-based oxygen scavenger includes metal and metal compound, which absorbs oxygen by reacting with oxygen. A metal which has an ionization tendency larger than hydrogen, such as Fe, Zn, Mg, Al, K, Ca, Ni, and Sn are preferably used for metal for inorganic-based oxygen scavenger. Iron is typically used. Powered metal is preferably used. Iron powder includes reduced iron powder, atomized iron powder, electrolyte iron powder, and the like. Conventionally known iron powder may be used without depending on its production method. An oxidized iron is reduced to be utilized for oxygen scavenger. Oxygen-defective type metal compound is also used. Examples of oxygen-defective type metal include cerium oxide ($CeO_2$), titanium oxide ($TiO_2$), zinc oxide (ZnO) and so on, from which oxygen are abstracted through reduction to become oxygen-defective state. A substance in such oxygen-defective state absorbs oxygen through the reaction with oxygen in atmosphere. These metals and metal compounds may be used together with a reaction accelerator such as metal halide and the like.

Examples of the organic oxygen scavenger include hydroxyl group-containing compound, quinone-based compound, double bond-containing compound, and easily oxidizable resin. These compounds contain hydroxyl group or double bond, which react with oxygen, thereby eliminating oxygen. Preferable organic oxygen scavenger includes ring-opened polymer of cycloalkane such as polyoctenylene, polyconjugated diene such as butadiene polymer or cyclized product thereof.

Composite type oxygen scavenger is a combination of transition metal catalyst and organic compound. The transition metal catalyst excites oxygen and allows the organic compound to react with oxygen, thereby eliminating oxygen. The organic compound in the composite type oxygen scavenger can react with oxygen faster than packaged substances such as food. Transition metal constituting the transition metal-based catalyst is selected at least one from the group consisting of titanium, vanadium, chromium, manganese, iron, cobalt, nickel, copper, zinc, zirconium, ruthenium, and palladium. Particularly, cobalt is preferred in the point of compatibility with resin, catalyst function, and safety. Preferable organic compound includes ring-opened polymer of cycloalkenes such as polyoctenylene, polymer of conjugated diene such as butadiene, and cyclized product thereof. Preferable other organic compound includes nitrogen-containing resin such as MXD nylon, tertiary hydrogen-containing resin such as polypropylene, polyalkylene ether bond-containing resin such as block copolymer having polyalkylene ether unit, anthraquinone polymer.

The amount of the oxygen scavenger to be added is not particularly limited, but is in the range of usually 1 to 30 wt %, preferably 3 to 25 wt %, more preferably 5 to 20 wt %, based on the weight of EVOH resin.

The content ratio in weight between transition metal-based catalyst and organic compound is not limited, but the ratio is adjusted so that the weight percentage of metals of them falls in the range of 0.0001 to 5 wt %, preferably 0.0005 to 1 wt %, more preferably 0.001 to 0.5 wt % based on the weight of the organic compound.

(E-3) Other Additives

Besides the aforementioned ingredients, the EVOH resin composition of the invention may contain a known additives such as aliphatic polyalcohol as plasticizer such as ethylene glycol, glycerin, and hexanediol; lubricant such as saturated aliphatic amide (e.g. stearamide), unsaturated fatty acid amide (e.g. amide oleate), bis-fatty acid amide (e.g. ethylene bis stearamide), and low molecular weight polyolefin (e.g. low molecular weight polyethylene or low molecular weight polypropylene having a molecular weight of 500 to 10000); antiblocking agent; antioxidant; colorant; antistatic agent; ultraviolet absorber; insecticide; insoluble inorganic salt (e.g. hydrotalcite); filler (e.g. inorganic filler); surfactant, wax; conjugated polyene compound, ene diol group-containing substance (e.g. phenols such as propyl gallate), and aldehyde compound (e.g. unsaturated aldehydes such as crotonaldehyde), if necessary. In the case of containing such additives, the adding content is within not impairing the effect of the invention, for example, less than 5 wt % based on the total weight of the resin composition, The conjugated polyene compound is a compound containing conjugated double bond which is a structure alternating carbon-carbon double bond and carbon-carbon single bond and has two or more carbon-carbon double bonds. The conjugated polyene includes conjugated dime consisting of one single and two double carbon-carbon bonds; conjugated triene consisting of two single and three double carbon-carbon bonds; and conjugated polyene consisting of more than two single and more than three double carbon-carbon bonds. A conjugated polyene containing more than 8 conjugated double carbon-carbon bonds is almost enough to color the resulting molded article. For this reason, a conjugated polyene containing 7 or less conjugated double bonds is preferably used. In the case of containing plural conjugated double bonds, one conjugated double bond may not be conjugated with the other conjugated double bond. For example, tung oil, which contains three conjugated trienes in the molecule, is included into the conjugated polyene compound.

Examples of the conjugated polyene compound include conjugated diene compound having two carbon-carbon double bonds such as isoprene, myrcene, farnesene, cembrene, sorbic acid, sorbic acid, sorbate, and abietic acid; conjugated triene compound having three double bonds such as 1,3,5-hexatriene, 2,4,6-octatriene-1-carboxylic acid, eleostearic acid, tung oil, and cholecalciferol; conjugated polyene compound having 4 or more double bonds such as cyclooctatetraene, 2,4,6,8-decatetraene-1-carboxylic acid, retinol, and retinoic acid. These conjugated polyene compounds may be used alone or a combination of two types or more of them.

The amount of the conjugated polyene to be added compound is selected from the range of usually 0.000001 to 1 part by weigh, preferably 0.00001 to 1 part by weight, particularly preferably 0.0001 to 0.01 part by weight, based on 100 parts by weight of EVOH resin.

The conjugated polyene compound may be preferably contained in EVOH resin in advance.

<Method for Preparation of EVOH Resin Composition>

The EVOH resin and the hydrate-formable alkaline earth metal salt both mentioned above are mixed commonly by melt-kneading or mechanically mixing method such as pellet dry-blend, preferably by melt-kneading. Specifically mixing is performed by dryblending ingredients and thereafter melt-kneading, or by adding hydrate-formable alkaline earth metal salt (B) to molten EVOH resin (A).

The resin composition of the invention may be directly molded and formed into a shaped article. Alternatively, a concentrated resin composition containing completely or partially dehydrated alkaline earth metal salt hydrate, called as masterbatch, is prepared in advance and the masterbatch is diluted with EVOH resin before molding to form a molded article. The ratio of weights of EVOH resin (A) to hydrate-formable alkaline earth metal salt (B) in the masterbatch, (A)/(B), is selected from the range of usually 10/90 to below 50/above 50.

Examples of the mixing process include (1) a process of blending the component (A) and the component (B) at the same time; (2) a process of blending excess content of the component (B) with the component (A) to prepare the component (B)-concentrated composition, and then diluting the component (B)-concentrated composition by adding an EVOH resin to obtain an intended composition.

The process (1) is commonly employed, however, the process (2) is sometimes preferably employed because of advantage in cost for transportation. In this case, the weight ratio of the content of EVOH resin (A) to the masterbatch, i.e. (A)/masterbatch, is selected in the range of usually 10/90 to 99/1, preferably 20/80 to 95/5, particularly preferably 30/70 to 90/10, depending on the composition of the masterbatch.

The processes of blending include a process of dry-blending with banbury mixer; a process of melt-kneading with uniaxial or biaxial extruder to pelletize; and other processes. The melt-kneading temperature is selected from the range of usually 150 to 300° C., preferably 170 to 250° C.

An impregnating method may be supposed to employ for preparing a resin composition. The impregnating method is performed by immersing an EVOH resin (A) and/or other thermoplastic resin (C) in aqueous solution of hydrate-formable alkaline earth metal salt (B) to impregnate the component (B) in these resin, followed by drying. However, the impregnating method is not recommended to be employed because hydrate-formable ability of the hydrate-formable alkaline earth metal salt (B) might be reduced in the molded article from the resin composition prepared by the method.

A method for mixing stable alkaline earth metal salt hydrate as the component (B) with EVOH resin (A) to be melt-kneaded, and removing hydration water from the alkaline earth metal salt hydrate to obtain a resin composition of the invention may be supposed to be employed. Actually, the method is rarely employed because bubbles might generate in the resin composition.

A melt-molded article is possible to be produced immediately from the resin composition of the invention prepared by melt-kneading ingredients as raw materials thereof. However, a molded article is preferably produced by pelletizing after melt-kneading the resin composition and melt molding the obtained pellets in view of industrial handling. A preferable pelletizing method is performed by melt-kneading ingredients with an extruder to extrude the resin composition in strand-like form and cutting the strand in view of economics.

The pellets may have a shape of sphere, circular cylinder, cube, cuboid and other like shape. The common shape is sphere or rugby ball-like shape, or circular cylinder. The pellet size as a convenient molding composition is as follows: in the case of sphere, diameter is usually between 1 and 6 mm, preferably between 2 and 5 mm, and in the case of circular cylinder, diameter of the circular bottom is usually between 1 and 6 mm, preferably 2 and 5 mm, and length is usually between 1 to 6 mm, preferably between 2 and 5 mm.

Adhering lubricant on a surface of the resin composition pellet is preferred for stabilizing the feeding property of the resin composition when melt-molded. As the lubricant, higher fatty acid (e.g. lauric acid, myristic acid, palmitic acid, stearic acid, behenic acid, oleic acid, and so on), higher fatty acid metal salt (e.g. aluminum salt, calcium salt, zinc salt, magnesium salt, or barium salt of higher fatty acid), higher fatty acid ester (methyl ester, isopropyl ester, butyl ester, octyl ester of higher fatty acid and so on), higher fatty acid amide (saturated aliphatic amide such as stearamide and docosanamide, unsaturated aliphatic amide such as oleamide and eruic amide, bis-fatty acid amide such as ethylene bis stearamide, ethylene bis oleamide, ethylene bis eruic amide, ethylene bis lauric amide), low molecular weight polyolefin (e.g. low molecular weight polyethylene or low molecular weight polypropylene having a molecular weight of 500 to 10,000, or its acid modified compound), higher alcohol, ester oligomer, fulorized ethylene resin. Higher fatty acid and/or a metal salt, ester, amide thereof are preferred, and higher fatty acid metal salt and/or higher fatty acid amide is more preferred.

The lubricant may be in the form of solid including powder, fine powder, flake, semi-solid, liquid, paste, solution, emulsion (i.e. aqueous dispersion), and other forms. Emulsion is preferred in the effective production of intended pellets of the resin composition.

Examples of the method of adhering the lubricant to the surface of the resin composition pellet include a method of mixing lubricant with resin composition pellet with a blender or the like apparatus; a method of immersing resin composition pellets in a solution or dispersion of lubricant; a method of spraying a solution or dispersion of lubricant to resin composition pellets. A preferable method is performed by feeding resin composition pellets to a blender or a like apparatus, and gradually adding emulsion of lubricant under agitation, thereby achieving evenly adhering the lubricant to the surface of the resin composition pellet. The adding speed for achieving even adhesion is from 0.001 to 1 parts by weight/hr, preferably 0.01 to 0.1 parts by weight/hr in the term of the solid content of the lubricant added based on 100 parts by weight of the resin composition pellets. The most preferable method is a method of contacting lubricant with resin composition pellets having a temperature higher than the temperature "(mp−50° C." which is 50° C. lower than the melting point (mp) of the lubricant, which can adhere the all lubricant strongly enough to prevent losing the adhered lubricant from the pellets in melt-molding apparatus.

The amount of the lubricant to be added is selected from the range of 10 to 1000 ppm, preferably 20 to 500 ppm, particularly preferably 50 to 250 ppm, based on the resin composition pellet, from the viewpoint of stable feeding in melt-molding.

<Melt-molded Article>

The resin composition of the invention is formed into film, sheet, cup, bottle and so on through melt-molding. The melt-molding method includes extrusion molding process (T-die extrusion, tubular (blown) film extrusion, blow molding, melt spinning, contour extrusion etc.), injection molding process, and the like. The melt-molding temperature is selected from the range of usually 150 to 300° C.

A melt-molded article from the resin composition of the invention may be directly applicable to various applications. In this case, the layer of the resin composition has a thickness of usually 1 to 5000 μm, preferably 5 to 4000 μm, particularly preferably 10 to 3000 μm.

The layer of the resin composition is typically obtained by aforementioned melt-molding process. In a typical melt-molded article from the resin composition of the invention, the component (B) is dispersed in the component (A) as a base resin.

<Multiple Layered Structure>

The multilayered structure of the invention comprises at least one layer of the resin composition of the invention. The layer containing a resin composition of the invention (hereinafter, simply called as "resin composition layer") is laminated over another substrate to improve strength of the multilayered structure or impart another function on the multilayered structure.

A preferable resin used for the substrate is a thermoplastic resin other than EVOH resin (hereinafter, called as "substrate resin").

The multilayered structure of the invention may employ a various types of layer constitution, such as a/b, b/a/b, a/b/a, a1/a2/b, a/b1/b2, b2/b1/a/b1/b2, b2/b1/a/b 1 /a/b1/b2, and other constitution, wherein "a" (for example, a1, a2, . . . ) denotes resin composition layer and "b" (for example, b1, b2, . . . ) denotes substrate resin layer. A recycled material, which is obtained by re-melt molding waste edges or scraps generated in the production of a multi layered structure, comprises EVOH resin composition and a substrate resin, and therefore may be utilized to form a multilayered structure such as b/R/a, b/R/a/b, b/R/a/R/b, b/a/R/a/b, b/R/a/R/a/R/b, wherein "R" denotes a layer of the recycled material. The number of layers included in the multilayered structure is selected from the range of usually 2 to 15, preferably 3 to 10 layers.

In the multilayered structure mentioned above, an adhesive resin layer may be interposed between the layers, if necessary.

Among these multilayered structures, a preferable multilayered structure is a multilayered structure containing at least one unit of b/a/b or b/adhesive resin layer/a/adhesive resin layer/b. In such multilayered structure, the inventive resin composition layer as an intermediate layer is sandwiched between substrate resin layers. In this case, at least one side of the resin composition layer (i.e. substrate resin layer and/or adhesive resin layer) employs hydrophobic resin layer, thereby sufficient drying effect by the component (B) would be obtained because the hydrophobic resin can reduce moisture level of absorption from atmosphere. In a multilayered structure used for packaging material to be subjected to a hot water treatment, employment of hydrophobic resin layer for at least one side of the resin composition layer in the aforementioned unit of the multilayered structure can retain oxygen barrier performance of the multilayered structure even after the treatment.

Examples of the substrate resin include polyethylene-based resins such as linear low density polyethylene, low density polyethylene, very low density polyethylene, medium density polyethylene, high density polyethylene, ethylene-propylene block- or random-copolymer, ethylene-α-olefin (having 4 to 20 carbon atoms) copolymer; polypropylene-based resins such as polypropylene, propylene-α-olefin (having 4 to 20 carbon atoms) copolymer, polybutene, polypentene, polycyclic olefin-based resin which has cyclic olefin structure in main chain and/or side chain, and other unmodified polyolefin-based resin; unsaturated carboxylic acid-modified polyolefin-based resin which is polyolefins graft modified with unsaturated carboxylic acid or its ester, and other polyolefin-based resin in wide meaning; ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester-based elastomer, polyurethane-based elastomer, polystyrene-based, halogenated polyolefin such as elastomer, chlorinated polyethylene, and chlorinated polypropylene, and aromatic or aliphatic polyketones.

Typical raw material of the substrate resin is naphtha and other material derived from petroleum. Also, a material derived from natural gas such as shale gas, sugar or starch contained in sugar cane, sugar beet, corn, and potato, and defecated material derived from cellulose contained in rice, wheat, millet and other plant may be used as a raw material for the substrate resin.

Among them, hydrophobic resins including polyamide-based resin, polyolefin-based resin, polyester-based resin and polystyrene-based resin are preferred, polyolefins such as polyethylene-based resin, polypropylene-based resin, polycyclic olefin-based resin, and these modified with unsaturated carboxylic acid are more preferred, polycyclic olefin-based resin is further more preferred.

A known adhesive resin is used for the adhesive resin and may be properly chosen depending on thermoplastic resin type used for the substrate resin "b". A typical adhesive resin is a carboxyl group-containing polyolefin-based resin obtained by chemically bonding unsaturated carboxylic acid or anhydride to polyolefin-based resin through addition reaction UI grafting reaction. For example, maleic anhydride graft modified polyethylene, maleic anhydride graft modified polypropylene, maleic anhydride graft modified ethylene-propylene block- or random-copolymer, maleic anhydride graft modified ethylene-ethylacrylate copolymer, maleic anhydride graft modified ethylene-vinyl acetate copolymer, maleic anhydride-modified polycyclic olefin-based resin, maleic anhydride graft modified polyolefin-based resin, or a combination of two or more of them may be used.

In the case of a multilayered structure in which an adhesive resin layer is interposed between the resin composition layer and the substrate resin layer, a resin having excellent hydrophobicity is preferably used for the adhesive resin because the adhesive resin layer is disposed on one side of the resin composition layer.

A known resin polycyclic olefin-based resin disclosed in, for instance JP2003-103718A, JP H5-177776A, and JP 2003-504523A, may be used. The polycyclic olefin-based resin exhibits lower moisture permeability comparing with linear aliphatic polyolefin such as polyethylene and polypropylene. In a sandwich type multilayered structure which includes the resin composition layer as an intermediate layer sandwiched between other thermoplastic resin layer(s) and/or adhesive resin layer(s), such polycyclic olefin-based resin is preferably employed for other thermoplastic resin layer and/or adhesive resin layer, thereby reducing moisture absorption in atmosphere or when treated with hot water. As a result, drying effect by the component (B) of the resin composition layer could be effectively obtained, which can prevent oxygen permeation even after a hot water treatment.

The substrate resin and the adhesive resin may contain plasticizer, filler, clay (e.g. montmorillonite), colorant, antioxidant, antistatic agent, lubricant, nucleating agent, antiblocking agent, ultraviolet absorber, wax, and other conventionally known additives in a content of the range without adversely affecting the invention, for example 30 wt % or less, preferably 10 wt % or less.

Laminating the inventive resin composition layer over the substrate resin layer, if necessary interposing adhesive resin layer between them, may be performed by a known method. Examples of the lamination processes include extruding a resin composition melt on substrate resin layer; coextruding a resin composition and substrate resin; dry-laminating resin composition layer and substrate resin layer using a known adhesive such as organic titanium compound, isocyanate compound, polyester-based compound, or polyurethane compound; coating a solution of resin composition on a film or sheet of substrate resin, and then removing the solvent of the solution. Of these processes, coextrusion is preferably employed from the viewpoint of cost and environment.

Thus produced multilayered structure may be subjected to (thermal) stretching process if necessary. Uniaxial or biaxial stretching may be conducted in the stretching process. In the biaxial stretching, simultaneous or sequential stretching may be employed. For the stretching technique, roll stretching, tenter stretching, tubular stretching, stretch blow molding, vacuum-pressure forming and other stretching technique including high magnification stretching may be employed. The stretching temperature is selected from the range of usually 40 to 170° C., preferably 60 to 160° C., as a temperature nearby the multilayered structure. Unduly low stretching temperature causes insufficient stretching. Unduly high stretching temperature makes difficult for maintaining stable stretched condition.

After stretching process, heat setting may be conducted for providing the multilayered structure with dimensional stability. A conventional known technique for heat setting is employed. For example, the stretched film is heat set at usually 80 to 180° C., preferably 100 to 165° C. in the period of usually 2 to 600 seconds with maintaining stretched condition.

In the case that thus obtained stretched multilayered film is used for shrink film, the stretched multilayered film is cooled in cold air for setting without heat setting treatment for the purpose of imparting thermal shrinkage property.

The multilayered structure of the invention may be formed to cup, tray and other multilayered container commonly by drawing. Specific examples of the drawing process include vacuum forming, air-pressure forming, vacuum-pressure forming, plug assist formula vacuum-pressure forming, and so on. In the case of producing a multilayered container such as tube and bottle using a multilayered parison, blow molding method including extrusion blow molding method (e.g. twin-head type, mold shift type, parison shift type, rotary type, accumulator type, and horizontal parison type), cold parison blow molding method, injection blow molding method, biaxial stretching blow molding method (e.g. extrusion cold parison biaxial stretching blow molding method, injection cold parison biaxial stretching blow molding method, and injection mold inline biaxial stretching blow molding method). The parison is hollow tubular article preformed before blow molding. Thus produced multilayered structure may be subjected to, if necessary, heat treatment, cooling treatment, rolling treatment, printing treatment, dry laminating, solution or molten coating treatment, bag making finish, deep drawing finish, box making finish, tube finish, sprit finish and the like.

The thickness of the multilayered structure including stretched multilayered structure as well as thicknesses of the layer constituting multilayered structure, i.e. resin composition layer, substrate resin layer, and adhesive resin layer, varies with resin type, adhesive resin type, use, package form, and intended physical properties. The thickness of multilayered structure including stretched multilayered structure is usually from 10 to 5000 µm, preferably from 30 to 3000 µm, particularly preferably from 50 to 2000 µm. The thickness of the resin composition layer is usually from 1 to 500 µm, preferably from 3 to 300 µm, particularly preferably from 5 to 200 µm. The thickness of the substrate resin layer is usually from 5 to 30000 µm, preferably from 10 to 20000 µm, particularly preferably from 20 to 10000 µm. The thickness of the adhesive resin layer is usually from 0.5 to 250 µm, preferably from 1 to 150 µm, particularly preferably from 3 to 100 µm.

The ratio of thicknesses of the resin composition layer to substrate resin layer in the multilayered structure, i.e. resin composition layer/substrate resin layer, is usually from 1/99 to 50/50, preferably 5/95 to 45/55, particularly preferably 10/90 to 40/60. The thickness ratio of the resin composition layer to the adhesive resin layer in the multilayered structure, i.e. resin composition layer/adhesive resin layer, is from usually 10/90 to 99/1, preferably 20/80 to 95/5, particularly preferably 50/50 to 90/10. If the multilayered structure include multiple resin composition layers, substrate resin layers or adhesive resin layers, the thickness of the most thick resin composition layer, substrate resin layer, or adhesive resin layer respectively is employed for the aforementioned thickness ratio.

Thus produced film, sheet, container made from stretched film such as bag, cup, tray, tube, bottle, and cover are useful for various packaging or container for general food as well as condiment such as mayonnaise, dressing, fermented food such as miso, oil and fat food such as salad oil, beverages, cosmetics, pharmaceutical preparations, and the like.

The layer of the resin composition of the invention is excellent in gas-barrier performance after hot water treatment, and therefore is useful for packaging for food to be subjected to a hot water treatment.

EXAMPLE

The invention will be specifically explained with examples below, but these examples do not limit the invention as long as it does not exceed the gist of the invention.

The term "parts" in Examples is on the basis weight unless otherwise indicated.

<Measurement and Evaluation Method>
[Water Absorption Property of Hydrate-Formable Alkaline Metal Salt]
(1) Water Content of Hydrate-formable Metal Salt The water content of hydrate-formable metal salt was determined according to thermogravimetric analysis (TGA) with "Pyris 1 TGA (Parkin-Elmer)".

The water content of completely dehydrated compound was determined as the weight thereof at the time that weight change had not been observed while monitoring water loss upon heating.

(2) Amount of water absorption (Xn) under the condition of 40° C. and 90% RH

A weight of hydrate-formable metal salt has been monitored while left standing under the condition of 40° C. and 90% relative humidity for 6 days. Amount of water absorption Xn is an amount absorbed by 100 g of hydrate-formable metal salt when placed under the condition of 40° C. and 90% relative humidity for n days, and calculated according to the formula below.

$Xn$=(amount of water absorption for $n$ days)/(initial weight)×100

The "amount of water absorption for n days" is calculated by subtracting the initial weight from the weight of the sample weighed at n days after from starting monitoring, wherein "initial weight" is a weight of the sample at starting monitoring and "n" is natural number selected from 1 to 6.

The "initial weight" and the "weight at n days after from starting monitoring" are weighed with a balance in a manner that the sample is put on a cup made of aluminum.

(3) Content of crystallization water Y (g) of maximum hydrate

Content of crystallization water Y (g) of maximum hydrate was determined by the following calculation.

$Y$=(number of water molecules per chemical formula unit of maximum hydrate×18)/(molecular weight of anhydride)×100

The molecular weight of anhydride is calculated based on the chemical formula of the anhydrous metal salt. The number of water molecules contained in the maximum hydrate indicated in brackets below respectively.

calcium lactate [pentahydrate], magnesium silicate [pentahydrate], trimagnesium phosphate [octahydrate], trimagnesium dicitrate [tetradecahydrate], magnesium sulfate [hepta hydrate], trisodium citrate [dihydrate], disodium succinate [hexahydrate], tetrasodium pyrophosphate [decahydrate].

(4) Initial speed of water absorption under the condition of 40° C. and 90% relative humidity: Z ([g/hydrate-formable alkaline earth metal salt 100 g]/day)

For Z, an amount of water absorption $X_1$ determined according to the aforementioned method (2) was employed. The amount of water absorption $X_1$ is a value after being left standing for 1 day.

(5) Local Maximum Point in Amount of Water Absorption

In the record of the change of the amount of water absorption during being left standing for 6 days under the condition of 40° C. and 90% relative humidity, if there is one day satisfying the following relation, local maximum point in amount of water absorption exists: Amount of water absorption $X_{n+1}$, which is an amount after being placed for (n+1) days, is smaller than $(X_n)$ which is an amount after being placed for n days.

[Evaluation of Resin Composition]
(6) Pellet Productivity

Pellet productivity in the production where EVOH resin composition prepared with melt-kneading was extruded with a twin-screw extruder to form pellets was evaluated based on the following criteria.

Good: stable continuous production due to stable strand is performed.

A type NG: it is hard to produce pellets stably and continuously due to frequent discontinuous strand caused from blister or foam.

B type NG: it is hard to produce pellets stably and continuously due to frequent discontinuous strand caused from insufficient resin melt.

(7) MFR of Pellet

The fluidity of EVOH resin composition melt was evaluated based on MFR of the obtained EVOH resin composition pellet, which is measured under the condition of 210° C. and load of 2160 g. In the case of extrusion molding, MFR is preferably selected from the range of 3 to 35 g/10 min.

(8) Kneading Property

The prepared resin composition was measured with use of melt-kneading apparatus "Plastograph® (from Brabender)

with respect to torques (Nm) after 5 minutes ($T_5$) and after 60 minutes ($T_{60}$) on melt-kneading under the following condition:

roller mixer: W50E (feeding amount of sample: 55 g)
    set temperature of apparatus: 250° C.
    rotational frequency of kneader: 50 ppm (9) Long-run Property In the torque value (Nm) obtained from the measurement (8), the case where the ratio of the torque ($T_{60}$) measured after 60 minutes to the torque ($T_5$) measured after 5 minutes, i.e. $T_{60}/T_5$, is 1 or more indicates an increasing tendency in viscosity. The ratio of 0.001 to 0.7 may be excellent in long-run property.

[Evaluation of Multilayered Structure]

(10) Oxygen Permeability (Cc/m$^2$·Day·Atm) after Retorting Treatment

A multilayered film sample having a size of 10 cm in length and 10 cm in width was subjected to retorting treatment in which the sample was immersed in hot water at 123° C. for 33 minutes with retort machine (HISAKA WORKS, Ltd.). The sample three days after the retorting treatment was measured with respect to its oxygen transmission rate (23° C., internal relative humidity: 90%, external relative humidity: 50%) with use of oxygen transmission rate test system (OX-TRAN 2/20 from MOCON, Inc.).

(11) Occurrence of Blister

The multilayered structure was placed for 40 days in a thermos-hygrostat chamber set at 40° C. and 90% relative humidity, and thereafter observed with eyes whether or not blister occurs.

(12) Resistance to Retorting Treatment (Elution-preventing Property)

A multilayered film sample having a size of 10 cm in length and 10 cm in width was subjected to retorting treatment in which the sample was immersed in hot water at 123° C. for 33 minutes with retort machine (HISAKA WORKS, Ltd.). The sample immediately after the retorting treatment was evaluated based on the following criteria with respect to whether or not the resin was eluted from the edge of the sample.

Good: elution of the resin was not visible.
    No Good: elution of the resin in a size of 0.1 mm or more was observed.

[Production of Multilayered Structure]

(I) Production of Type I Multilayered Structure

The prepared resin composition pellets were fed to an extruder equipped with T die set at 230° C. to form 3-element 5-layer multilayered film having a thickness of 600 μm. The extrusion condition was set as follows. Used was a coextrusion multilayer film molding apparatus equipped with three extruders and 3-element 5-layer type feedblock, multilayer film molding die and winder. The coextrusion was conducted under the condition below and cooled with chill roll in which cooling water is circulated. Thus produced multilayered film of polypropylene/adhesive resin/resin composition/adhesive resin/polypropylene having thicknesses (μm) of 270/15/30/15/270. "Novatec™ PP EA7A" from Japan Polypropylene Corporation and "Admer™ QF500" from Mitsui Chemicals, Inc. were employed for the polypropylene and the adhesive resin respectively.

extruder for EVOH resin composition: 40 mmφ single screw extruder (barrel temperature: 220° C.)
    extruder for PP layers: 40 mmφ single screw extruder (barrel temperature: 220° C.)
    extruder for adhesive resin layers: 32 mmφ single screw extruder (barrel temperature: 220° C.)
    die: 3-element 5-layer type feedblock die (die temperature: 220° C.)
    chill roll temperature: 50° C.

(II) Production of Type II Multilayered Structure

The prepared pellets of the resin composition was fed to an extruder with T die to set at 230° C. to form 3-element 5-layer multilayered film having a thickness of 320 μm. The extrusion condition was set as follows. Used was a coextrusion multilayer film molding apparatus equipped with three extruders and 3-element 5-layer type feedblock, multilayer film molding die and winder was used. The coextrusion was conducted under the condition below and cooled with chill roll in which cooling water is circulated. Thus produced multilayered film of polypropylene/adhesive resin/resin composition/adhesive resin/polypropylene having thicknesses (μm) of 120/20/40/20/120. "Novatec™ PP EA7A" from Japan Polypropylene Corporation and "Admer™ QF500" from Mitsui Chemicals, Inc. were employed for the polypropylene and the adhesive resin respectively.

extruder for EVOH resin composition: 40 mmφ single screw extruder (barrel temperature: 220° C.)
    extruder for PP layers: 40 mmφ single screw extruder (barrel temperature: 220° C.)
    extruder for adhesive resin layers: 32 mmφ single screw extruder (barrel temperature: 220° C.)
    die: 3-element 5-layer type feedblock die (die temperature: 220° C.)
    chill roll temperature: 50° C.

[Relationship Between Type of Hydrate-formable Metal Salt and Water Absorption Property]

The following hydrate-formable alkaline metal salts which were used in examples were analyzed with respect to water absorption property according to the aforementioned method. The measurement results are shown in Table 1.

calcium lactate (completely dehydrated compound): it was prepared by placing calcium lactate pentahydrate (Wako Pure Chemical Industries, Ltd.) in hot air dryer set at 150° C. for 0.5 hours. Thus prepared dehydrated compound had a water content of 1.8% according to thermogravimetric analysis.
    magnesium silicate (completely dehydrated compound): it was prepared by placing magnesium silicate pentahydrate (Wako Pure Chemical Industries, Ltd.) in hot air dryer set at 230° C. for 5 hours. Thus prepared dehydrated compound had a water content of 6.8% according to thermogravimetric analysis.
    trimagnesium phosphate (completely dehydrated compound): it was prepared by placing trimagnesium phosphate octahydrate (Wako Pure Chemical Industries, Ltd.) in hot air dryer set at 230° C. for 5 hours. Thus prepared dehydrated compound has a water content of 5.9% according to thermogravimetric analysis.
    magnesium sulfate (completely dehydrated compound): it was magnesium sulfate anhydride (Wako Pure Chemical Industries, Ltd.) and having a water content of 1.0% according to thermogravimetric analysis.
    trimagnesium dicitrate (i) (completely dehydrated compound): it was prepared by placing dimagnesium tricitrate nonahydrate (Wako Pure Chemical Industries, Ltd.) in hot air dryer set at 230° C. for 1 hour. Thus prepared dehydrated compound has a water content of 1.5% according to thermogravimetric analysis.
    trimagnesium dicitrate (ii) (completely dehydrated compound): it was trimagnesium dicitrate anhydride (JOST CHEMICAL), whose water content was 0.6% according to thermogravimetric analysis.

trimagnesium dicitrate nonahydrate (iii): it was trimagnesium dicitrate nonahydrate (JOST CHEMICAL), whose water content was 28% according to thermogravimetric analysis.

trisodium citrate (completely dehydrated compound): it was trisodium citrate anhydride (Iwata Chemical., Co. Ltd.), whose water content was 0.4% according to thermogravimetric analysis.

disodium succinate (completely dehydrated compound): it was prepared by placing disodium succinate hexahydrate (Wako Pure Chemical Industries, Ltd.) in hot air dryer set at 230° C. for 1 hour. Thus prepared dehydrated compound has a water content of 1.5% according to thermogravimetric analysis.

sodium pyrophosphate (completely dehydrated compound): it was tetrasodium pyrophosphate (Taiyo Chemical Industry Co. Ltd.), which has a water content of 1.2% according to thermogravimetric analysis.

It is understood that dehydrated alkali metal salts do not seem to have local maximum point in water absorption amount.

[Production of EVOH Resin Composition Nos. 1 to 14]

EVOH resin (A) was a saponified ethylene-vinyl acetate copolymer having a content of ethylene unit 29 mol %, saponification degree 99.6%, boric acid content 500 ppm (converted value from boron analysis), MFR of 4.3 g/10 minutes (210° C., load of 2160 g), and volatile matter content of 0.2%. The EVOH resin (A) and hydrate-formable metal salt were blended in a content ratio shown in Table 2, and fed to a feeder, followed by melt-kneading with twin-screw extruder having two mixing zones in the condition mentioned below. Thus prepared EVOH resin compositions were extruded in strand, and cut the strand with drum type pelletizer to obtain column pellet having diameter of 2 mm, length of 3.5 mm, and volatile matter content: 0.3%. Pellet

TABLE 1

|  | Metal salt | Water content (%) | Change of water absorption amount with days (40° C., 90% RH) | | | | | | Y | $X_5/Y$ | Z $(X_1)$ | Local maximum point in water absorption amount |
| --- | --- | --- | --- | --- | --- | --- | --- | --- | --- | --- | --- | --- |
|  |  |  | 1 day $(X_1)$ | 2 days $(X_2)$ | 3 days $(X_3)$ | 4 days $(X_4)$ | 5 days $(X_5)$ | 6 days $(X_6)$ |  |  |  |  |
| Alkaline earth metal salt | Ca lactate | 1.8 | 35 | 46 | 51 | 51 | 51 | 51 | 41 | 1.24 | 35 | absent |
|  | Mg silicate | 6.8 | 20 | 21 | 21 | 21 | 22 | 22 | 34 | 0.65 | 20 | absent |
|  | Trimagnesium phosphate | 5.9 | 14 | 15 | 16 | 16 | 17 | 17 | 55 | 0.31 | 14 | absent |
|  | Mg sulfate | 1.0 | 110 | 160 | 200 | 230 | 260 | 264 | 105 | 2.48 | 110 | absent |
|  | Trimagnesium dicitrate (i) | 1.5 | 80 | 105 | 110 | 85 | 65 | 56 | 56 | 1.16 | 80 | present |
|  | Trimagnesium dicitrate (ii) | 0.6 | 52 | 85 | 98 | 103 | 104 | 74 | 56 | 1.86 | 52 | present |
|  | Trimagnesium dicitrate (iii) | 28 | 0 | 0 | 0 | 0 | 0 | 0 | 56 | 0 | 0 | absent |
| Alkali metal salt | Trisodium citrate | 0.4 | 61 | 134 | 186 | 202 | 213 | 223 | 14 | 15.21 | 61 | absent |
|  | Disodium succinate | 1.5 | 235 | 290 | 315 | 330 | 335 | 337 | 67 | 5.00 | 235 | absent |
|  | Tetrasodium pyrophosphate | 1.2 | 62 | 66 | 66 | 66 | 66 | 66 | 68 | 0.97 | 62 | absent |

Trimagnesium dicitrate (i) (Wako Pure Chemical Industries, Ltd.): completely dehydrate
Trimagnesium dicitrate (ii) (JOST CHEMICAL): completely dehydrate
Trimagnesium dicitrate (iii) (JOST CHEMICAL): partially dehydrate (nonahydrate)

Magnesium sulfate is an alkaline earth metal salt, but has $X_5/Y$ more than 2.0 and has a large amount of water absorption. Regarding hydrate-formable alkaline earth metal salt, if partially dehydrated compound has relatively poor water absorption and already contain some crystallization water, the hydrate-formable alkaline earth metal salt would have a relatively small $X_5/Y$ even under a high-temperature and high-humidity condition although its completely dehydrated compound satisfies the claimed range of $X_5/Y$, Regarding dehydrated alkaline earth metal salts each having a $X_5/Y$ value between 0.2 and 2.0, some have local maximum points but others have no local maximum point in water absorption amount. It is understood that trimagnesium dicitrate absorbs water amount beyond the amount capable of containing as crystallization water once, and then releases extra water to become close to a hydrate in stable state.

Regarding dehydrated alkali metal salt, as well as dehydrated alkaline earth metal salt, exhibited similar water absorption behavior under a high-temperature and high-humidity condition. Some had $X_5/Y$ out of range of and other had $X_5/Y$ within the range of 0.2 to 2.0.

productivity was evaluated based on a state of the extruded strand from the die in the production.

Melt-kneading condition for production of EVOH resin composition Nos. 1 to 4 and 6 twin-screw extruder: 20 mm diameter, L/D=25 (Imoto Machinery Co., Ltd.)

set temperature of extruder: C1/C2/C3/D=185/240/240/240° C.

screw rotation speed: 100 ppm out put: 4 kg/hour cooling for strand: water cooling take-up speed: 11.5 m/min.

Melt-kneading condition for production of EVOH resin composition Nos. 5 and 7-14 twin-screw extruder: 32 mm diameter, L/D=56 (The Japan Steel Works, Ltd)

set temperature of extruder:

C2/C3/C4/C5/C6/C7/C8/C9/C10/C11/C12/C13/C14/C15/C16/D=90/90/110/150/220/230/230/230/230/230/230/230/230/230/230/230° C.

screw rotation speed: 150 ppm
out put: 12 kg/hour
cooling for strand: air cooling
take-up speed: 8.8 m/min.

Thus produced EVOH resin composition pellet Nos. 1 to 14 were measured with respect to MFR according to the aforementioned measuring method. Type I multilayered structure was produced using the pellet Nos. 1 to 14 by the method mentioned above and was evaluated with respect to oxygen permeability after retorting treatment and occurrence of blister. The evaluation results are shown in Table 2.

ing $X_5/Y$ of more than 2.0, i.e. No. 4, blister occurred after placed under a high-temperature and high-humidity condition for 30 days. Also, regarding EVOH resin composition employing an alkali metal salt having $X_5/Y$ above 2.0, i.e. No. 5, blister occurred while being placed under a high-temperature and high-humidity condition.

Regarding trimagnesium dicitrate, completely dehydrated compound has $X_5/Y$ within the range between 0.2 and 2.0 whereas partially dehydrated compound has $X_5/Y$ out of the range between 0.2 and 2.0. The partially dehydrated trimagnesium dicitrate introduces blister generation during melt-

TABLE 2

| | composition | | | Absorption property of metal salt | | Evaluation of resin composition | | Evaluation of multilayered structure | |
|---|---|---|---|---|---|---|---|---|---|
| Resin composition No. | EVOH amount (part) | Metal salt type | amount (part) | $X_5/Y$ | Z ($X_1$) | Pellet productivity | MFR (g/10 min) | Occurrence of blister under a high-temperature and high-humidity condition (days when blister occurred) | Oxygen permeation amount after retorting treatment (cc/m² · day · atm) |
| 1 | 90 | Ca lactate | 10 | 1.24 | 35 | Good | 3.1 | No occur | 16 |
| 2 | 90 | Mg silicate | 10 | 0.65 | 20 | Good | 3.4 | No occur | 17 |
| 3 | 90 | Trimagnesium phosphate | 10 | 0.31 | 14 | Good | 4.1 | No occur | 18 |
| 4 | 90 | Mg sulfate | 10 | 2.48 | 110 | Good | 4.2 | Occur (30 days after) | 0.6 |
| 5 | 90 | Trisodium citrate | 10 | 15.21 | 61 | Good | 3.7 | Occur (25 days after) | 2.0 |
| 6 | 90 | Trimagnesium dicitrate (i) | 10 | 1.16 | 80 | Good | 3.9 | No occur | 3.1 |
| 7 | 90 | Trimagnesium dicitrate (ii) | 10 | 1.86 | 52 | Good | 4.7 | No occur | 2.8 |
| 8 | 90 | Trimagnesium dicitrate (iii) | 10 | 0 | 0 | A-NG | — | — | — |
| 9 | 95 | Trimagnesium dicitrate (ii) | 5 | 1.86 | 52 | Good | 4.9 | No occur | 7.8 |
| 10 | 80 | Trimagnesium dicitrate (ii) | 20 | 1.86 | 52 | Good | 2.4 | No occur | 0.34 |
| 11 | 60 | Trimagnesium dicitrate (ii) | 40 | 1.86 | 52 | Good | 1.1 | No occur | 0.10 |
| 12 | 99.5 | Trimagnesium dicitrate (ii) | 0.5 | 1.86 | 52 | Good | 4.2 | No occur | 27 |
| 13 | 40 | Trimagnesium dicitrate (ii) | 60 | 1.86 | 52 | B-NG | — | — | — |
| 14 | 100 | — | — | — | — | Good | 4.3 | No occur | 2.9 |

According to Table 2, for EVOH resin composition, employment of dehydrated alkaline earth metal salts each having $X_5/Y$ of 0.2 to 2.0, i.e. calcium lactiate, magnesium silicate, trimagnesium phosphate, and completely dehydrated trimagnesium dicitrate, could suppress the occurrence of blister even after placed under a high-temperature and high-humidity condition. Please see Nos. 1 to 3, and so on. In particular, in the case of employing completely dehydrated trimagnesium dicitrates, each of which has local maximum point in water absorption (Nos. 6 and 7), the resulting resin composition could retain excellent gas-barrier performance even after retorting treatment so that the oxygen permeation of the resulting resin composition is lower than that employing other dehydrated alkaline earth metal salts having no local maximum point in water absorption.

On the other hand, regarding EVOH resin composition employing completely dehydrated magnesium sulfate havmolding, and therefore the resin composition had difficulty in melt-molding as shown in No. 8. Regarding completely dehydrated trimagnesium dicitrate, unduly high content of the completely dehydrated trimagnesium dicitrate caused to lower fusing property of the resin composition to the other resin and thereby becoming difficult in the production of a multilayered structure as shown in No. 13. On the other hand, unduly low content of the completely dehydrated trimagnesium dicitrate caused to increase of oxygen permeation after retorting treatment and thereby becoming insufficient gas-barrier performance as shown in No. 12.

Unduly high content of alkaline earth metal did not significantly affecting the production of pellets but lowered MFR, resulting in impairing melt extrusion property of pellets as shown in No. 11.

Regarding a multilayered structure made from EVOH resin alone, i.e. No. 14, blister did not occurred after placed under a high-temperature and high-humidity condition. For this result, the occurrence of blister after placed under a high-temperature and high-humidity condition seems like a specific phenomenon in the presence of containing hydrate-formable metal salt.

[Preparation and Evaluation of EVOH Resin Composition Nos. 20 to 28]

As other thermoplastic resin (C), used was a terminal-modified 6 nylon, which has terminal COOH group of 22 μeq/g, melting point of 225° C., MFR of 5 g/10 minutes (250° C., load of 2160 g), and satisfies the relationship: 100×b/(a+b)=31. In the formula, [a] denotes the number of terminal COOH group, [b] denotes the number of terminal $CONR^{10}R^{20}$ group wherein $R^{10}$ is a hydrocarbon group having from 1 to 22 carbon atoms, and $R^{20}$ is hydrogen atom or a hydrocarbon group having from 1 to 22 carbon atoms.

As a dispersing agent, calcium stearate ("calcium stearate S" from NOF Corporation) or monoglyceride stearate ("monogly D" from NOF Corporation) was used.

EVOH resin (A), hydrate-formable metal salt, polyamide resin, and dispersing agent were blended at the ratio indicated in Table 3, to prepare the resin composition Nos. 20 to 28. These resin compositions were evaluated with respect to long-run property of the resin composition according to the aforementioned method. Next, each resin composition was fed to a feeder and melt-kneaded with twin-screw extruder having two mixing zones and extruded in a strand under the condition below, and cut the strand with a drum type pelletizer to form column pellets having diameter of 2 mm, length of 3.5 mm and volatile matter content of 0.3%.

twin-screw extruder: 32 mm diameter, L/D=56 (The Japan Steel Works, Ltd)
set temperature of extruder:
C2/C3/C4/C5/C6/C7/C8/C9/C10/C11/C12/C13/C14/C15/C16/D=90/90/110/150/220/230/230/230/230/230/230/230/230/230/230
screw rotation speed: 150 ppm
out put: 12 kg/hour
cooling for strand: air cooling
take-up speed: 8.8 m/m in.

Thus obtained pellets were formed to a type II multilayered structure by the aforementioned method, and the resulting multilayered structure was evaluated with respect to oxygen permeability after retorting treatment, occurrence of blister, and resistance to retorting treatment. The evaluation results were shown in Table 3.

TABLE 3

| | | Multilayered film No. | | | | | | | | |
|---|---|---|---|---|---|---|---|---|---|---|
| | | 20 | 21 | 22 | 23 | 24 | 25 | 26 | 27 | 28 |
| composition | Amount of EVOH (part) | 90 | 90 | 80 | 80 | 80 | 80 | 80 | 85 | 80 |
| | Metal salt type | Tri-magnesium dicitrate (ii) | Tri-magnesium dicitrate (ii) | Tri-magnesium dicitrate (ii) | Tri-magnesium dicitrate (ii) | Mg Sulfate | Disodium succinate | Tetrasodium pyrophosphate | Tri-magnesium dicitrate (ii) | Tri-sodium citrate |
| | Amount (part) | 10 | 9 | 10 | 9 | 9 | 9 | 9 | 9 | 9 |
| | Amount of polyamide (part) | — | — | 10 | 10 | 10 | 10 | 10 | 5 | 10 |
| dispersant (part) | Ca stearate | — | 1 | — | 1 | 1 | — | 1 | 1 | 1 |
| | Monoglyceride | — | — | — | — | — | 1 | — | — | — |
| evaluation | Occurrence of blister (days when blister occurs) | No occur | No occur | No occur | No occur | Occur (16 days after) | Occur (34 days after) | No occur | No occur | Occur (33 days after) |
| | Oxygen permeation amount (cc/m$^2$·day·atm) | 5.7 | 5.6 | 5.8 | 5.7 | 1.0 | — | 24 | 6.4 | 5.3 |
| | Elution-preventing property | NG | NG | Good | Good | Good | Good | Good | Good | Good |
| Torque (Nm) | $T_5$ | 5.5 | 5.5 | 6.8 | 6.1 | 6.6 | — | 8.1 | 5.8 | 7.0 |
| | $T_{60}$ | 17.9 | 8.4 | 16.2 | 3.4 | 0.3 | — | 6.7 | 4.4 | 2.1 |
| | Long-run property $T_{60}/T_5$ | 3.25 | 1.53 | 2.38 | 0.56 | 0.05 | — | 0.83 | 0.76 | 0.30 |

In the case of the EVOH resin compositions free from polyamide resin, i.e. Nos. 20 and 21, remarkably reduction of oxygen permeation amount after retorting treatment was not obtained but EVOH resin was eluted. On the other hand, in the case of the EVOH resin compositions containing polyamide resin, i.e. Nos. 22 to 28, resin elution was not found. From these results, it is understood that the addition of polyamide to the resin composition is effective for preventing the elution of the EVOH resin. However, in the case of the EVOH resin compositions containing hydrate-formable alkali metal salt and polyamide resin, i.e. Nos. 25 and 28, the effect of preventing elution of the EVOH resin was not observed, but blister occurred after placed under a high-temperature and high-humidity condition. Also, the EVOH resin composition containing magnesium sulfate having $X_5/Y$ higher than 2.0, i.e. No. 24, blister occurred.

EVOH resin composition No. 20, which contains neither polyamide resin nor calcium stearate, was increased in torque during kneading due to addition of hydrate-formable alkaline earth metal salt. Addition of either polyamide resin or calcium stearate enables to suppress the increasing tendency in viscosity as shown in Nos. 21 and 22. Calcium stearate exhibited more excellent effect of suppression of increasing viscosity, without impairing the effect in the presence of polyamide resin as shown in Nos. 21, 23 and 27. For these results, it is understood that the addition of both calcium stearate and polyamide resin makes possible to achieve excellent gas-barrier performance without elution of EVOH resin, and to attain the value $T_{60}/T_5$ less than 1 for assuring excellent long-run property.

INDUSTRIAL APPLICABILITY

A multilayered structure including a layer of the EVOH resin composition of the invention is excellent in gas-barrier performance after a hot water treatment and therefore avoid the blister generation as a fault after placed under a high-temperature and high-humidity condition. Accordingly, the multilayered structure is significantly useful in industry.

What is claimed is:

1. A resin composition comprising (A) a saponified ethylene-vinyl ester copolymer and (B) a hydrate-formable alkaline earth metal salt,
   wherein the (B) hydrate-formable alkaline earth metal salt satisfies water absorption properties (I), (II), and (III):
   (I) a ratio of $X_5/Y$ being in the range of 0.2 to 2.0 wherein the $X_5$ is an amount of water absorption when (B) hydrate-formable alkaline earth metal salt is placed under a condition of 40 °C. and 90% relative humidity for 5 days, and (Y) is a content of crystallization water in maximum hydrate of the (B) hydrate-formable alkaline earth metal salt;
   (II) an amount of water absorption (Z) based on 100 g of (B) hydrate-formable alkaline earth metal salt being 10 g or more when the (B) hydrate-formable alkaline earth metal salt is placed under a condition of 40 °C. and 90% relative humidity for 24 hours; and
   (III) a local maximum point existing in change of amount of water absorption of the (B) hydrate-formable alkaline earth metal salt while placed under a high-temperature and high-humidity condition.

2. The resin composition according to claim 1, wherein the alkaline earth metal salt (B) is a completely or partially dehydrated alkaline earth metal salt of acid, or a mixture thereof, the acid being selected from the group consisting of lactic acid, silicic acid, phosphoric acid, and citric acid, and the partially dehydrated alkaline earth metal salt having a water content of 50 wt% or less.

3. The resin composition according to claim 1, wherein a content ratio (A/B) in parts by weight of the (A) saponified ethylene-vinyl ester copolymer to the parts by weight of the (B) hydrate-formable alkaline earth metal salt is in the range between above 50/below 50 and 99/1.

4. The resin composition according to claim 1, further comprising (C) polyamide resin.

5. The resin composition according to claim 1, further comprising (D) dispersing agent.

6. A resin composition comprising (A) a saponified ethylene-vinyl ester copolymer and (B) a hydrate-formable alkaline earth metal salt,
   wherein (B) hydrate-formable alkaline earth metal salt satisfies water absorption property (I), (II), and (III):
   (I) a ratio of $X_5/Y$ being in the range of 0.2 to 2.0 wherein the $X_5$ is an amount of water absorption when (B) hydrate-formable alkaline earth metal salt is placed under a condition of 40 °C. and 90% relative humidity for 5 days, and (Y) is a content of crystallization water in maximum hydrate of the (B) hydrate-formable alkaline earth metal salt;
   (II) an amount of water absorption (Z) based on 100 g of (B) hydrate-formable alkaline earth metal salt being 10 g or more when the (B) hydrate-formable alkaline earth metal salt is placed under a condition of 40 °C. and 90% relative humidity at 40 °C.; and
   (III) a local maximum point existing in change of amount of water absorption of the (B) hydrate-formable alkaline earth metal salt while placed under a high-temperature and high-humidity condition.

7. The resin composition according to claim 6, wherein the alkaline earth metal salt (B) is a completely or partially dehydrated alkaline earth metal salt of acid, or a mixture thereof, the acid being selected from the group consisting of lactic acid, silicic acid, phosphoric acid, and citric acid, and the partially dehydrated alkaline earth metal salt having a water content of 50 wt% or less.

8. The resin composition according to claim 6, wherein a content ratio (A/B) in parts by weight of the (A) saponified ethylene-vinyl ester copolymer to the parts by weight of the (B) hydrate-formable alkaline earth metal salt is in the range between above 50/below 50 and 99/1.

9. The resin composition according to claim 6, further comprising (C) polyamide resin.

10. The resin composition according to claim 6, further comprising (D) dispersing agent.

11. The resin composition according to claim 4, wherein a content ratio (A/C) in parts by weight of the (A) saponified ethylene-vinyl ester copolymer to the (C) polyamide resin is in the range between 99/1 and 70/30.

12. The resin composition according to claim 5, wherein the content of the (D) dispersing agent is from 0.01% by weight to 5% by weight based on the resin composition.

* * * * *